(12) United States Patent
Bae et al.

(10) Patent No.: US 11,044,653 B2
(45) Date of Patent: Jun. 22, 2021

(54) METHOD OF PROCESSING ANCHOR USER PLANE FUNCTION (UPF) FOR LOCAL OFFLOADING IN 5G CELLULAR NETWORK

(71) Applicant: Samsung Electronics Co., Ltd., Gyeonggi-do (KR)

(72) Inventors: Beomsik Bae, Gyeonggi-do (KR); Jinsung Lee, Gyeonggi-do (KR); Jicheol Lee, Gyeonggi-do (KR); Kisuk Kweon, Gyeonggi-do (KR); Sangjun Moon, Seoul (KR); Jungshin Park, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/825,029

(22) Filed: Mar. 20, 2020

(65) Prior Publication Data
US 2020/0221361 A1    Jul. 9, 2020

Related U.S. Application Data

(63) Continuation of application No. 16/103,483, filed on Aug. 14, 2018, now Pat. No. 10,602,415.

(30) Foreign Application Priority Data

Aug. 14, 2017 (KR) .................. 10-2017-0102882
Oct. 20, 2017 (KR) .................. 10-2017-0136422

(51) Int. Cl.
*H04W 36/16* (2009.01)
*H04W 36/00* (2009.01)
(Continued)

(52) U.S. Cl.
CPC ...... *H04W 36/165* (2013.01); *H04W 36/0011* (2013.01); *H04W 76/30* (2018.02); *H04W 36/0027* (2013.01); *H04W 76/32* (2018.02)

(58) Field of Classification Search
CPC ............... H04W 36/165; H04W 76/30; H04W 36/0011; H04W 76/32; H04W 36/0027
See application file for complete search history.

(56) References Cited

U.S. PATENT DOCUMENTS

2018/0192471 A1    7/2018  Li
2018/0199398 A1    7/2018  Dao
(Continued)

FOREIGN PATENT DOCUMENTS

WO    WO 2017/078258    5/2017
WO    WO 2018/038503    3/2018

OTHER PUBLICATIONS

Huawei, HiSilicon, Samsung, 3GPP TSG SA WG2 Meeting #122, S2-175207, Jun. 26-Jun. 30, 2017, San Jose Del Cabo, Mexico, TS 23.501: DL Data buffering and DDN, pp. 3.

(Continued)

*Primary Examiner* — Duc C Ho
(74) *Attorney, Agent, or Firm* — The Farrell Law Firm, P.C.

(57) ABSTRACT

Disclosed are a communication scheme and a system thereof for converging an IoT technology and a 5G communication system for supporting a high data transmission rate beyond that of a 4G system. The present disclosure can be applied to intelligent services (for example, services related to a smart home, smart building, smart city, smart car, connected car, health care, digital education, retail business, security, and safety) based on the 5G communication technology and the IoT-related technology. The present disclosure relates to a method of processing an anchor UPF for local offloading when a UE moves in a 5G cellular wireless communication system.

12 Claims, 29 Drawing Sheets

(51) Int. Cl.
 *H04W 76/30* (2018.01)
 *H04W 76/32* (2018.01)

(56) References Cited

U.S. PATENT DOCUMENTS

| | | | |
|---|---|---|---|
| 2018/0376444 A1 | 12/2018 | Kim | |
| 2019/0053147 A1 | 2/2019 | Qiao | |
| 2019/0182895 A1* | 6/2019 | Di Girolamo | H04W 88/16 |
| 2020/0037386 A1* | 1/2020 | Park | H04L 29/06 |
| 2020/0077356 A1* | 3/2020 | Youn | H04W 8/065 |
| 2020/0112898 A1* | 4/2020 | Ramle | H04W 36/08 |

OTHER PUBLICATIONS

NTT Docomo et al., "23.501: 'PDU Session Anchor' Terminology Clarification", S2-174704, SA WG2 Meeting #122, Jun. 26-30, 2017, 5 pages.

3GPP, 3rd Generation Partnership Project; Technical Specification Group Services and System Aspects; System Architecture for the 5G System; Stage 2, (Release 15), 3GPP TS 23.501 V1.0.0, Jun. 2017, 146 pages.

LG Electronics, "TS 23.502: DN Authorization and PDU Session Anchor Relocation", S2-174591, SA WG2 Meeting #122, May 26-30, 2017, 11 pages.

Samsung, "Discussion on Anchor UPF Relocation Timing in Case of UE Mobility", S2-173264, SA WG2 Meeting #121, May 15-19, 2017, 3 pages.

International Search Report dated Nov. 15, 2018 issued in counterpart application No. PCT/KR2018/009249, 4 pages.

ETRI, Samsung, Huawei, HiSilicon, KT, "TS 23.501 Clarification of SSC Modes", S2-175206, SA WG2 Meeting #122, Jun. 26-30, 2017, 3 pages.

Huawei, HiSilicon, "TS 23.502: Update Service Request Procedures", S2-174817, SA WG2 Meeting #122, Jun. 26-30, 2017, 8 pages.

European Search Report dated Jul. 3, 2020 issued in counterpart application No. 18845581.0-1212, 9 pages.

* cited by examiner

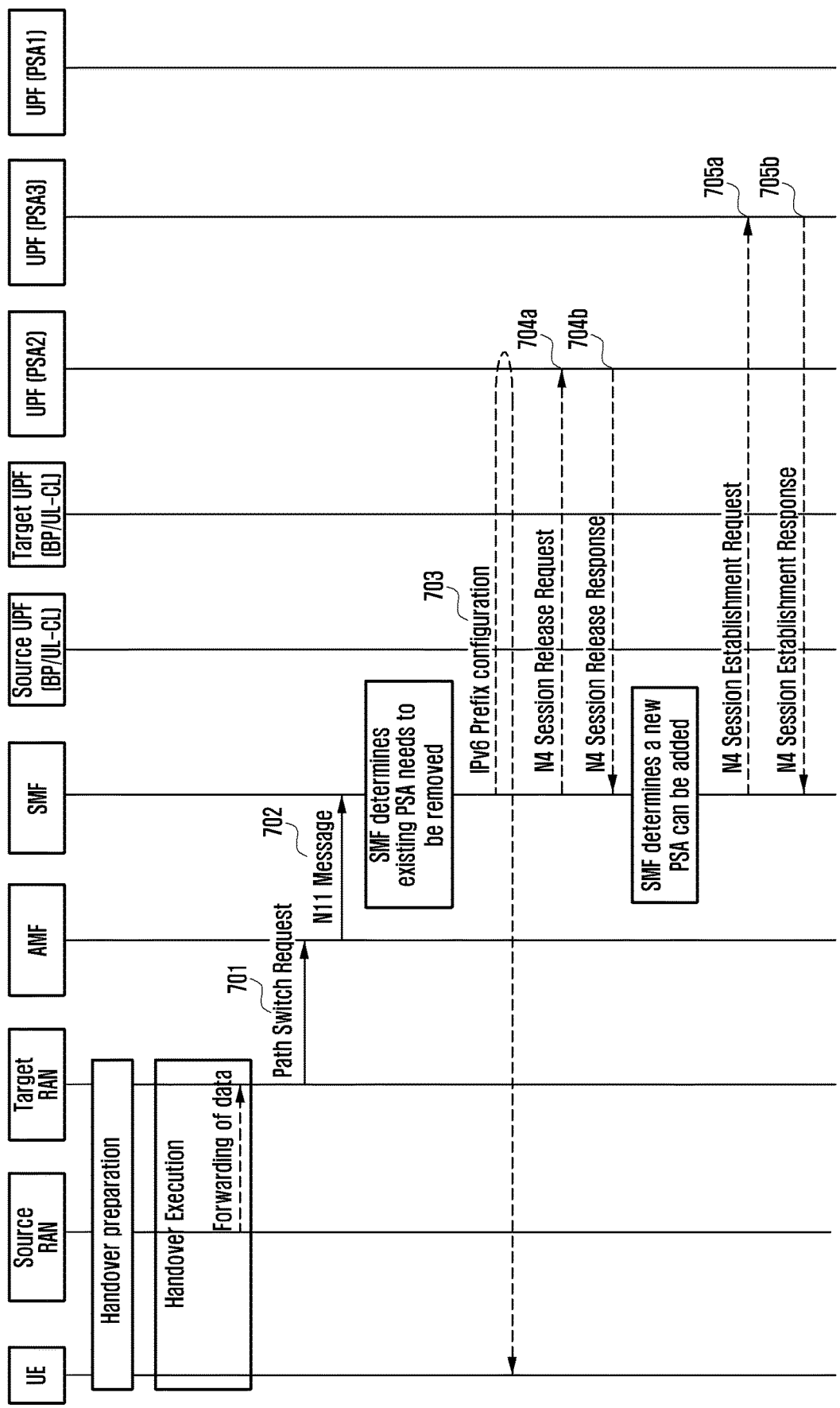

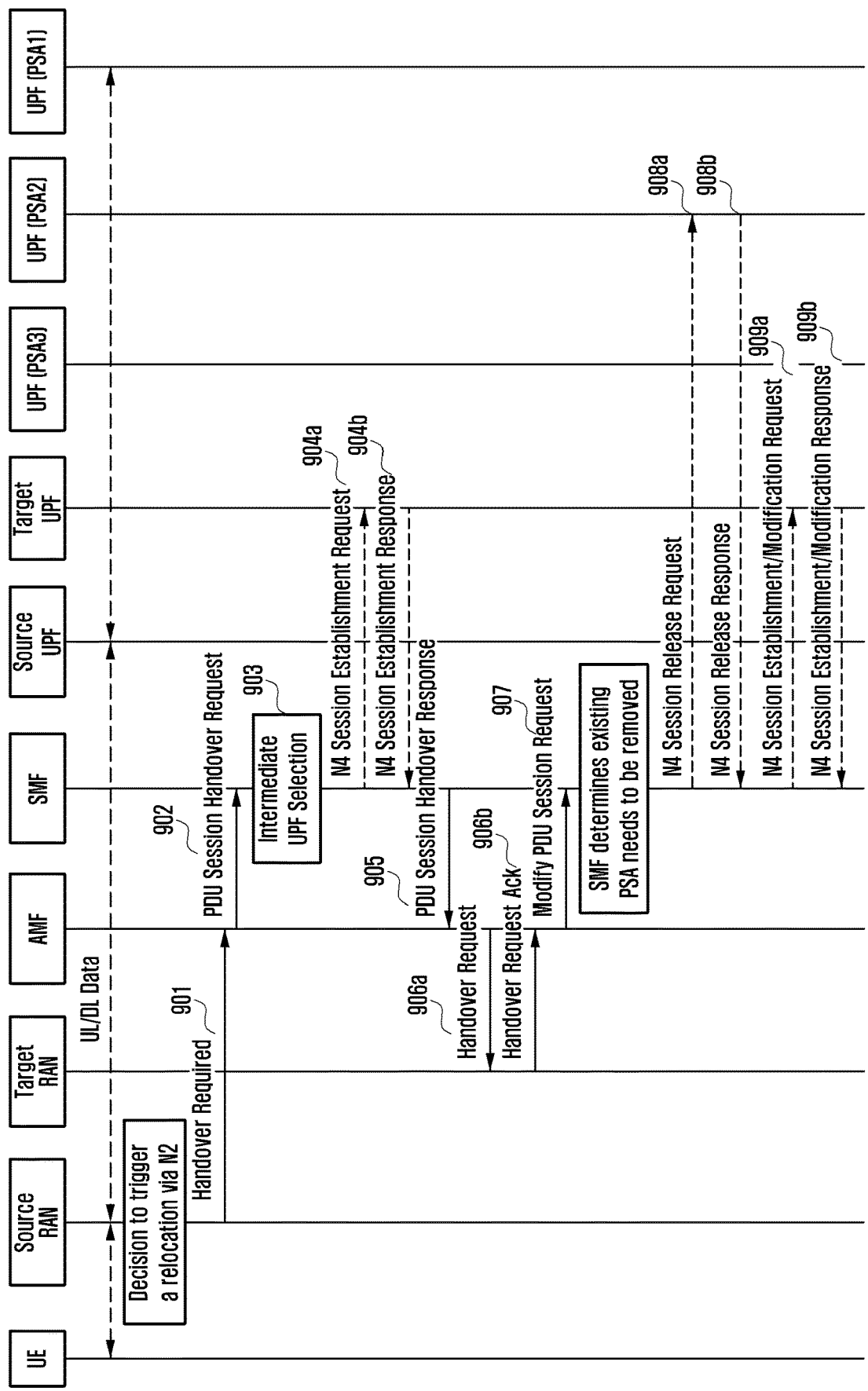

METHOD OF PROCESSING ANCHOR USER PLANE FUNCTION (UPF) FOR LOCAL OFFLOADING IN 5G CELLULAR NETWORK

CROSS-REFERENCE TO RELATED APPLICATION(S)

The present application is a Continuation of U.S. application Ser. No. 16/103,483, which was filed in the U.S. Patent and Trademark Office on Aug. 14, 2018, and issued as U.S. Pat. No. 10,602,415 on Mar. 24, 2020, and claims benefit under 35 U.S.C. § 119(a) to Korean Patent Application Serial No. 10-2017-0102882, filed on Aug. 14, 2017, and Korean Patent Application Serial No. 10-2017-0136422, filed on Oct. 20, 2017 in the Korean Intellectual Property Office, the entire disclosure of each of which is incorporated herein by reference.

BACKGROUND

1. Field

The present disclosure relates generally to a method, and more particularly to a method of processing an anchor user plane function (UPF) for local offloading when a user equipment (UE) moves in a 5G cellular wireless communication system.

2. Description of the Related Art

The above information is presented as background information only to assist with an understanding of the present disclosure. No determination has been made, and no assertion is made, as to whether any of the above might be applicable as prior art with regard to the present disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

A method of adding or removing the anchor UPF may vary depending on the existence or non-existence of a non-access stratum (NAS) signaling connection between the UE and the access and mobility management function (AMF) of the 5G network (divided into a CM-IDLE or CM-CONNECTED state). When an N9 tunnel between the anchor UPF and a branching point (BP) or uplink (UL) classifier (UL CL) UPF in charge of traffic routing is maintained for the UE in the CM-IDLE state, overhead (e.g., an amount of backhaul traffic forwarded from a local server) may be generated since data transmission with the anchor UPF should be maintained through addition of an intermediate UPF in order to guarantee session continuity even though the UE leaves a service area of the anchor UPF. Particularly, as the UE is farther away from the service area of the anchor UPF, overhead according to the addition of the intermediate UPF may be large. This may be against the purpose of reducing backhaul traffic within the cellular network through local offloading by placing the anchor UPF close to the UE.

In order to facilitate evolution from the conventional 4G long-term evolution (LTE) system to the 5G system, a 3GPP in charge of cellular mobile communication standards has named a new core network structure as a 5G core (5GC) and standardized it.

SUMMARY

The present disclosure has been made to address at least the disadvantages described above and to provide at least the advantages described below.

The present disclosure relates to a procedure including signaling between network entities within a 5G core network in order to add the anchor UPF to a PDU session or remove the anchor UPF from the PDU session if the UE which sets up the PDU session for a specific data network name (DNN) (e.g., Internet) moves to the area or leaves the area when a 5G cellular network service provider installs an anchor UPF for local offloading in a specific area. Further, the present disclosure provides a method of notifying the UE of the addition and the removal of the anchor UPF.

According to the present disclosure, when a local server (e.g., a content/multimedia server) installed on cache content for each area in the 5G cellular network and an anchor UPF which can communicate with the local server are arranged, overhead from using a local offloading solution for each area can be reduced even though the UE frequently moves by applying a UL CL solution or an IPv6 multi-homing solution to some traffic of the conventionally set up PDU session and the performance of traffic offloading can be increased by controlling an amount of offloaded traffic in the corresponding actual area.

In accordance with an aspect of the present disclosure, a method performed by a session management function (SMF) entity in a wireless communication system is provided. The method includes allocating a first protocol data unit (PDU) session anchor at a procedure for establishing a PDU session on a terminal; allocating a second PDU session anchor, the second PDU session anchor being associated with the PDU session, the first PDU session anchor being associated with a service and session continuity (SSC) mode of the PDU session, and the second PDU session anchor being independent of the SSC mode of the PDU session; identifying a mobility of the terminal; maintaining the first PDU session anchor regardless of the mobility of the terminal in case that the SSC mode of the PDU session is SSC mode 1; and releasing the second PDU session anchor based on the mobility of the terminal.

In accordance with an aspect of the present disclosure, a session management function (SMF) entity in a wireless communication system is provided. The SMF entity includes a transceiver; and a controller configured to allocate a first protocol data unit (PDU) session anchor at a procedure for establishing a PDU session on a terminal, allocate a second PDU session anchor, the second PDU session anchor being associated with the PDU session, the first PDU session anchor being associated with a service and session continuity (SSC) mode of the PDU session, and the second PDU session anchor being independent of the SSC mode of the PDU session, identify a mobility of the terminal, maintain the first PDU session anchor regardless of the mobility of the terminal in case that the SSC mode of the PDU session is SSC mode 1, and release the second PDU session anchor based on the mobility of the terminal.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 7A and 7B are diagrams of an Xn-based handover procedure, according to an embodiment;

FIGS. 9A and 9B are diagrams of an N2-based handover procedure, according to an embodiment;

DETAILED DESCRIPTION

Figure 1:
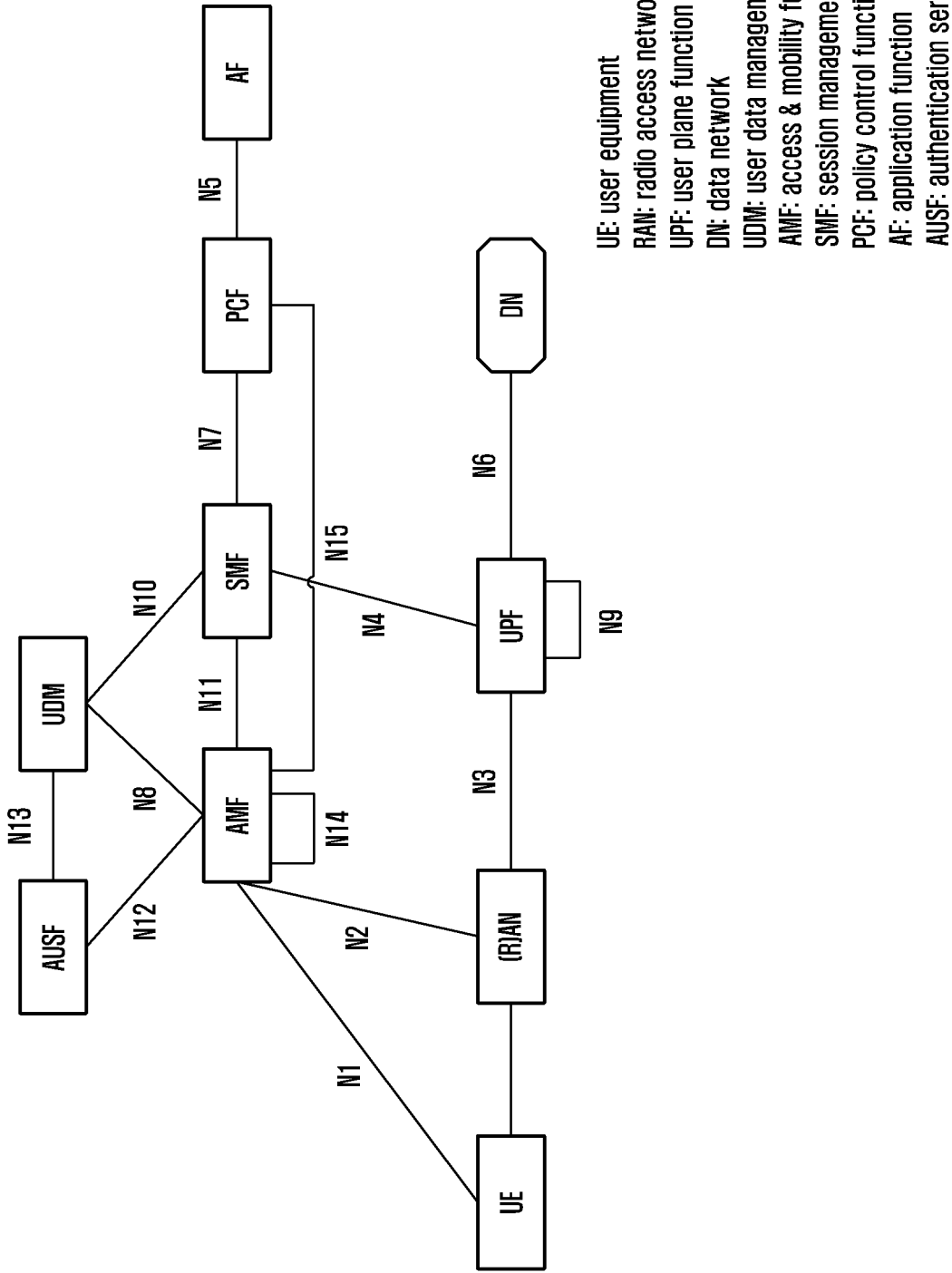
FIG. 1 is a diagram of a network structure and an interface of a 5G cellular system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Hereinafter, a BS is the entity that allocates resources to a UE, and may be one of an eNode B, a Node B, a BS, a RAN, a radio access unit, a base station controller, and a node on a network. The UE may include a UE, a mobile station (MS), a cellular phone, a smart phone, a tablet, a computer, and a multimedia system capable of performing a communication function. Herein, DL refers to a wireless transmission path of a signal that the BS transmits to the UE, and UL refers to a wireless transmission path of a signal that the UE transmits to the BS.

The 5GC supports differentiated functions compared to an evolved packet core (EPC), which is a network core for the conventional 4G.

One differentiated function is a network slice function. In requirements of 5G, the 5GC should support various UE types and services (e.g., enhanced mobile broadband (eMBB), ultra reliable low latency communications (URLLC), massive machine type communications (mMTC)). The UEs/services have different requirements for the core network. For example, the eMBB service requires a high data rate and the URLLC service requires high stability and low latency. A technology proposed to meet such various service requirements is the network slice scheme. The network slice is a method of virtualizing one physical network to generate several logical networks, and network slice instances (NSIs) may have different characteristics. This is possible because each NSI has a network function (NF) suitable for the characteristic thereof. Various 5G services may be efficiently supported by allocating the NSI suitable for the service characteristic required for each UE.

Supporting a network virtualization paradigm is easy through division of a mobility management function and a session management function. In the conventional 4G LTE, all UEs may receive services over the network through a signaling exchange with a single core equipment that is a mobile management entity (MME) in charge of registration, authentication, mobility management, and session management functions. However, when the single equipment such as the MME supports all functions as the number of UEs explosively increases and mobility and traffic/session characteristics, which should be supported according to the UE type, are subdivided in the 5G, scalability for adding entities according to each of required functions cannot help being reduced. Accordingly, various functions are developed based on a structure of dividing a mobility management function and a session management function in order to improve a function/implementation complexity of a core equipment serving a control plane and expandability in the light of signaling load.

FIG. 1 is a diagram of a network architecture and an interface of a 5G cellular system, according to an embodiment.

Referring to FIG. 1, an AMF for managing mobility and network registration of the UE and an SMF for managing an end-to-end session are separated and may exchange signaling through an N11 interface.

An SSC mode is introduced to support requirements of various continuities of applications or services of the UE and use of a PDU session-specific SSC mode. The SSC mode includes three modes. SSC mode 1 is a mode in which an anchor UPF (or a PDU session anchor (PSA)) that is a communication contact with an external data network (DN) is not changed while the corresponding session is maintained including when the UE moves, and the session continuity can be guaranteed since an IP address/prefix allocated to the corresponding session is not changed. SSC modes 2 and 3 allow the change (relocation) of the anchor UPF. However, SSC modes 2 and 3 may differ in that, while the connection with the anchor UPF should be immediately disconnected and then the connection with a new anchor UPF should be established in SSC mode 2 when the anchor UPF is changed, the connection with the existing anchor UPF can be maintained while the connection with the new anchor UPF is established in SSC mode 3. Accordingly, in the SSC mode 3 session, data can be simultaneously transmitted through a plurality of anchor UPFs for the same external data network. However, since the SSC mode 2 session corresponds to break-before-make, overhead for signaling between entities and tunnel management is small in a core network but service interruption may occur if the anchor UPF is changed at a time point at which traffic of the UE is transmitted.

A policy control function (PCF) is included, which is a server that manages a service provider policy for the UE and may store a policy for making a request for and selecting a session for each UE and provide the policy to the UE, so that the service provider can use it for routing traffic of the UE. The policy is named a UE route selection policy (URSP). Particularly, the URSP may include a network slice selection policy (NSSP) for supporting the network slicing technology, an SSC mode selection policy (SSCMSP) for supporting the SSC mode, and a DNN selection policy for selecting a DNN corresponding to an access point name (APN) used by the EPC. The URSP may be managed while being paired with a traffic filter for specifying a rule for particular traffic. For transmission of the URSP from the PCF to the UE, the PCP may first transmit it to the AMF through an standard interface (e.g., N15) and the AMF may transfer the UE-specific URSP through a standard interface (e.g., N1) by non-access stratum (NAS) signaling with the UE.

Figure 2:
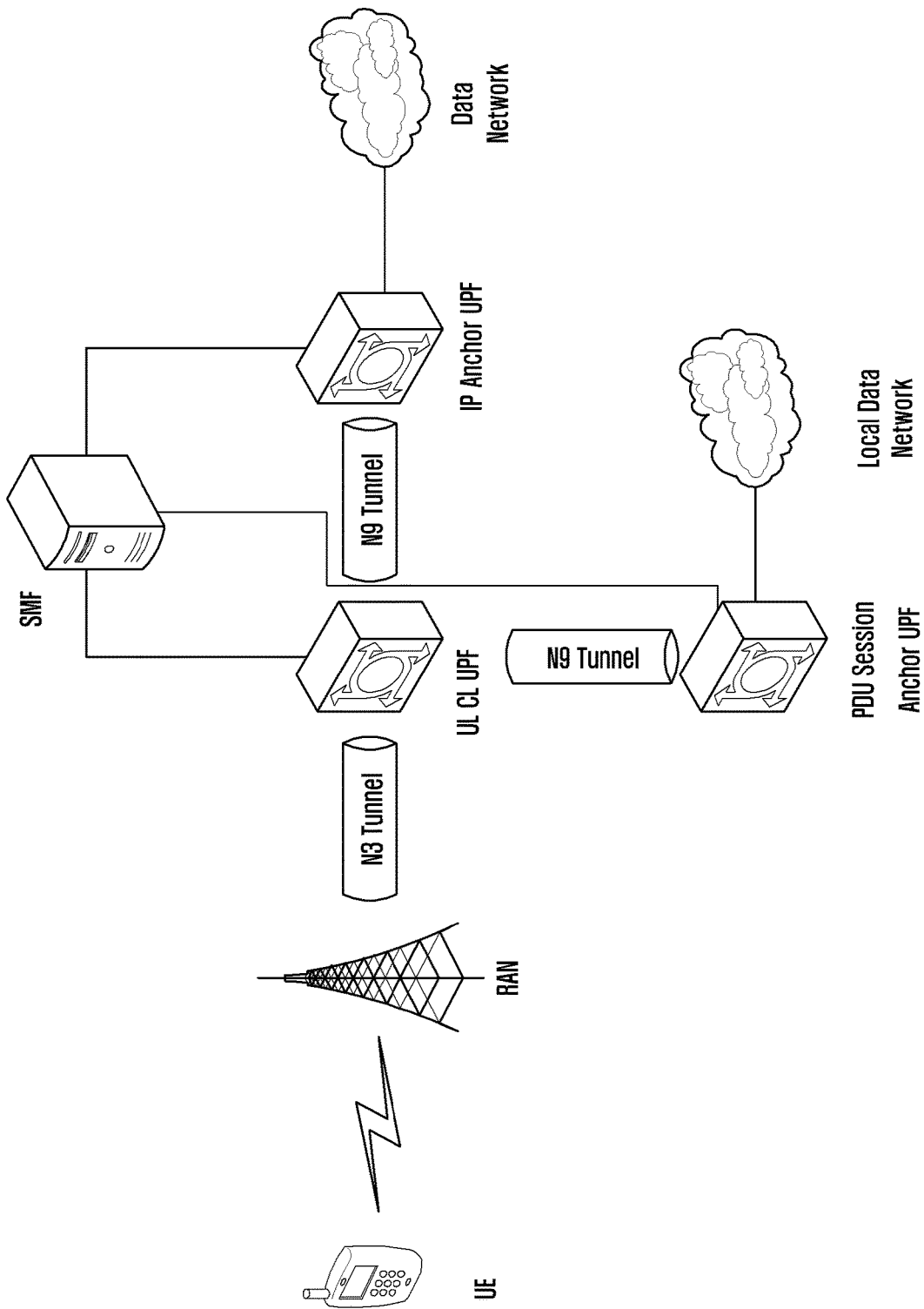
FIG. 2 is a diagram of a network structure, according to an embodiment.

FIG. 2 is a diagram of a network structure showing an application example of a UL CL solution that provides a function of local-offloading some traffic to a place close to the location of the UE by allocating one IPv4 address to a PDU session heading for the same DNN in a 5G cellular network, according to an embodiment.

Referring to FIG. 2, another function is to provide a solution for local offloading. When a single IP address is allocated to a specific session of the UE, a function of dividing UL traffic of the UE through the UPF that is a UL CL or adding DL traffic heading for the UE may be provided. Particularly, in order to offload some traffic of the session to a local server close to the location of the UE, the SMF may configure a (e.g., 5-tuple-based) traffic rule in the UL CL UPF. Based on the traffic rule, the UL CL UPF may re-route some traffic to the local server to be transparent to the UE.

Figure 3:
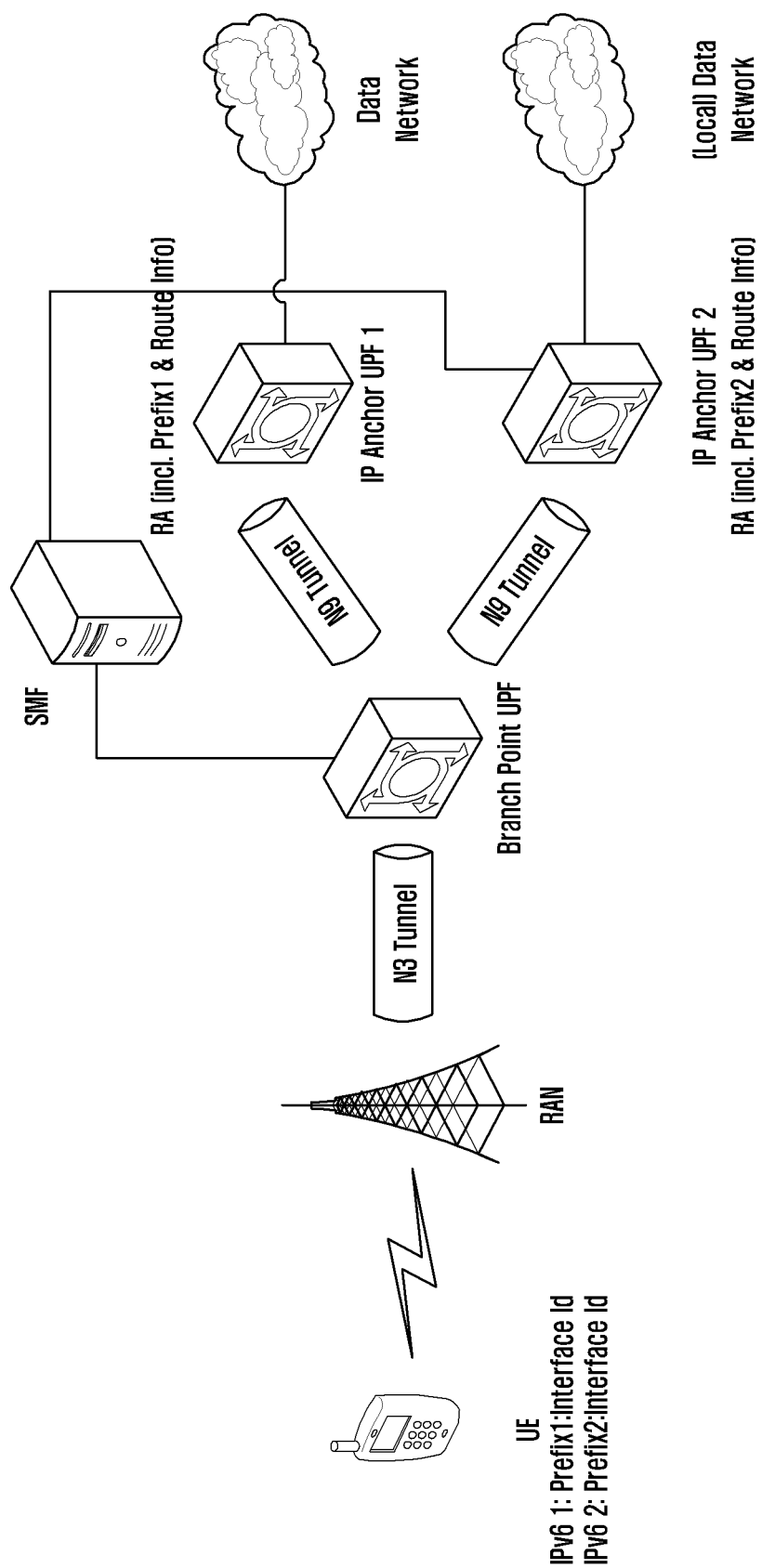
FIG. 3 is a diagram of a network structure, according to an embodiment.

FIG. 3 is a diagram of a network structure showing an application example of a BP solution that provides a function for local-offloading some traffic of the PDU session heading for the same DNN to the place close to the location of the UE by allocating different IPV6 prefixes to respective IP anchor UPFs for the PDU Session in IPv6 type, according to an embodiment.

Meanwhile, referring to FIG. 3, 5GC may provide a multi-homing function to the PDU session in the IPv6 type in which a plurality of IPv6 prefixes are allocated to one PDU session and the UE may perform data communication using a proper IPv6 prefix. Similar to the UL CL UPF, a BP UPF may divide or add traffic based on a traffic rule. However, the UE may determine traffic to be local-offloaded by selecting the IPv6 prefix allocated to the UE. For the determination of routing by the UE, the SMF may add a route information option proposed in the document IETF RFC 4191 to an IPv6 router advertisement message and transmit the IPv6 router advertisement message to the UE through UP signaling via a data path of the corresponding PDU session.

In the 5G cellular network, a technique for edge computing that is a local area data network (LADN) is supported. Specifically, the technique is a method by which the network provides data network information available in an area in which the UE is currently located and the UE generates a data network session which can be used in the corresponding area using the provided available data network information and, when the UE leaves an area in which transmission/reception of the data session is possible, releases or temporarily stops (or deactivate) the generated session. This is a technique implemented when the UE sets up a new PDU session for the LADN which is different from a method described below. Further, in the LTE system, all IP traffic from the UE ends at a PDN-GW. In addition, local IP access (LIPA) and selected IP traffic offloading (SIPTO) are proposed to place the IP anchor close to the UE in order to improve a delay in a backhaul network. Similarly, this is different from the method described below in the light of configuring a new PDN connection by the UE.

Figure 4:
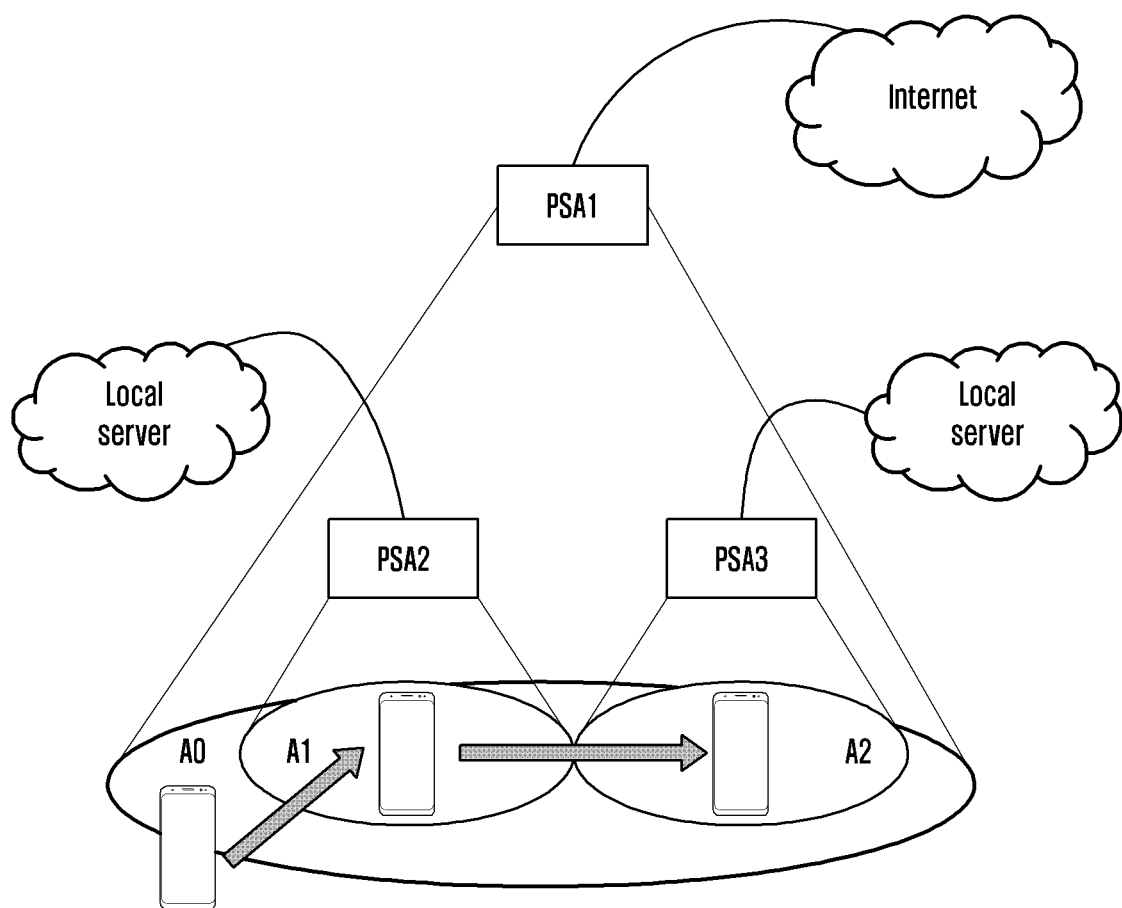
FIG. 4 is a diagram of a case in which a UE moves between areas, according to an embodiment.

FIG. 4 is a diagram of a case in which a UE moves between areas, when an anchor UPF (corresponding to PSA1) covering a wide area for data communication with a specific DNN (e.g., Internet) and anchor UPFs (corresponding to PSA2 and PSA3) covering some areas in which a local server belonging to the DNN is arranged are disposed, the UE moves from an area A0 to an area A2 via A1, according to an embodiment.

Referring to FIG. 4, a scheme of maintaining or releasing the anchor UPF for the PDU session in which a data transmission path including the anchor UPF is configured when the UE moves to enter or leave a service area (A1 or A2) of an anchor UPF (PSA2 or PSA3) installed for communication with a local server in the 5G cellular network, is described. Even though the anchor UPF for local offloading is released, the anchor UPF (PSA1) that provides a wider service area (A0) should be continuously maintained for the data transmission path of the PDU session. The movement of the UE may refer to a change in the BS which the UE accesses.

Leaving the service area of the anchor UPF for local offloading for communication with the local server may be defined in detail as follows. When the UE moves to the BS installed within the service area of the anchor UPF, the UPF and the BS have connectivity therebetween. When the UE moves to the BS which is not included in the service area of the UPF, the UPF and the BS do not have connectivity therebetween. This can be applied when the anchor UPF coexists with the BS. Further, when connection between the UPF and the BS is limited due to dynamic conditions such as a service provider policy or a load state of the anchor UPF even though the UPF and the BS can be physically connected through, the Internet may be included in the range of non-connectivity. In addition, as mentioned in the handover procedure of the document 3GPP TS 23.401 that defines the EPC standards, when there is no direct IP connectivity between the two entities may be included in the range of non-connectivity. The service area of the anchor UPF may be preset in the SMF by a service provider local policy or dynamically allocated by a PCF that controls a policy of the session after the PDU session is set up.

The SMF may separately manage an additional anchor UPF for local offloading for each DNN and an original anchor UPF for connection with a specific DN such as an Internet network which is not for local offloading when the PDU session is initially made. The original anchor UPF may operate to link with an SSC mode. When the UE moves and leaves the service area of the original anchor UPF, an intermediate UPF may be added for session continuity. Further, for the PDU session corresponding to SSC mode 2/3, the original anchor UPF may be changed to a new anchor UPF which can cover the current location of the UE. However, when the UE moves and leaves the service area of the additional anchor UPF, the additional anchor UPF may be released from the corresponding PDU session by the SMF and only the original anchor UPF may be left. In other words, the additional anchor UPF may operate regardless of the SSC mode. In addition, when the location to which the UE moves is included in a service area of another additional anchor UPF, a new additional anchor UPF may be added.

When the SMF separately manages two types of anchor UPFs, the SMF may notify the UE of the classification. Particularly, for the PDU session in which an IP address (including an IPv6 prefix) is allocated for each anchor UPF, information indicating whether the anchor UPF associated with an IP address pertains to the original anchor UPF or the additional anchor UPF may be provided when the IP address is allocated to the UE. Further, when the anchor UPF is added to or changed in the PDU session of the UE, information indicating where the corresponding anchor UPF pertains to may be provided. When the anchor UPF is added, the notification may be provided by transmitting an indicator indicating whether the anchor UPF is the original anchor UPF or the additional anchor UPF to the UE.

The anchor UPF may be named a PDU session anchor or a PDA. Further, the additional anchor UPF and the original anchor UPF may be differently named.

The IPv6 prefix corresponds to the PDU session in the IPv6 type. The IPv6 prefix may be replaced with an IPv4 address if the PDU session in the IPv4 type is used in cellular system in which IPv4 multi-homing is supported.

In FIGS. 5A, 5B, 5C, and 6, an internal operation of the SMF and an internal operation of the UE is described. The SMF may manage information on a service area of the additional anchor UPF for local offloading for each DNN of the PDU session which the UE sets up.

Figure 5A:
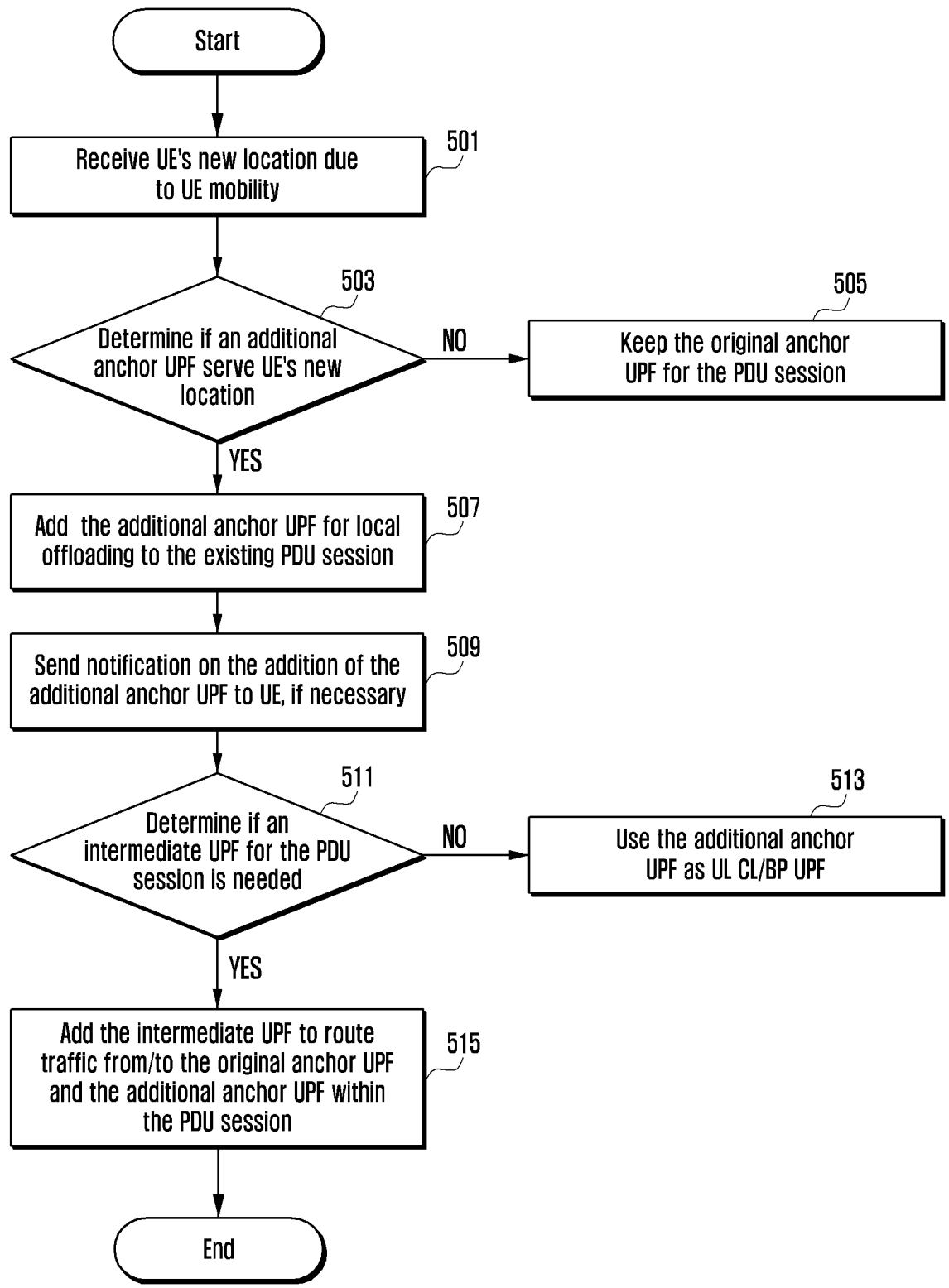
FIG. 5A is a flowchart of an internal operation of a session management function (SMF), according to an embodiment.

FIG. 5A is a flowchart of an internal operation of an SMF for adding an additional anchor UPF when the UE enters a service area of the additional anchor UPF for local offloading for a PDU session, according to an embodiment.

Referring to FIG. 5A, when the UE moves and is informed that the UE enters the service are of the additional anchor UPF for local offloading managed by the SMF from the AMF at step 501, the SMF may determine whether a new location of the UE is an area in which the additional anchor UPF can provide a service at step 503. When it is determined that the UE does not enter the service area of the additional anchor UPF, the SMF maintains the PDU session by the original anchor UPF at step 505. When it is determined that the UE enters the service area of the additional anchor UPF, the SMF may add the additional anchor UPF to the existing PDU session of the UE supporting a DNN which is the same as that supported by the additional anchor UPF at step 507. When adding the additional anchor UPF to the PDU session, the SMF may newly register service area information for receiving a notification of the change in the UE location for the corresponding PDU session in the AMF. The service area information to be registered in the AMF may be acquired based on the service area of the additional anchor UPF. The SMF may inform the UE of the addition of the additional anchor UPF to the PDU session at step 509. Thereafter, the SMF determines whether the original anchor UPF of the corresponding PDU session can service the current location of the UE at step 511. That is, it is determined whether an intermediate UPF is needed. When the SMF determines that the original anchor UPF of the corresponding PDU session can service the new location of the UE, the SMF may establish an N3 tunnel for connecting the BS which the UE currently accesses and the original anchor UPF at step 513. Further, the additional anchor UPF may be used as a UL CL/BP UPF. However, when it is determined that the original anchor UPF cannot service the new location of the UE, the SMF may add a new intermediate UPF between the original anchor UPF and the BS which the UE accesses to guarantee session continuity at step 515.

Figure 5B:
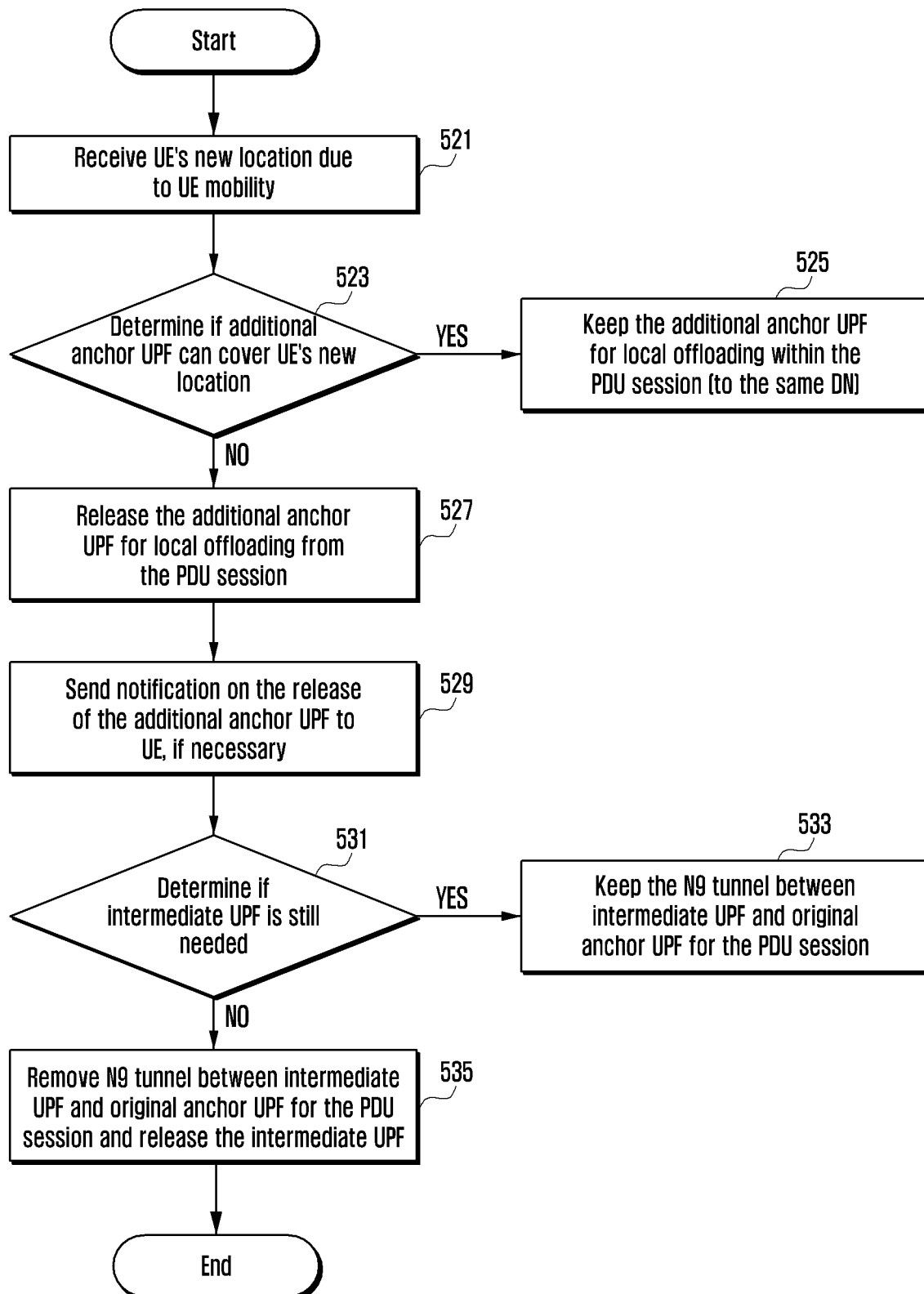
FIG. 5B is a flowchart of an internal operation of the SMF, according to an embodiment.

FIG. 5B is a flowchart of an internal operation of the SMF for releasing the additional anchor UPF when the UE leaves the service area of the additional anchor UPF for local offloading for the PDU session, according to an embodiment.

Referring to FIG. 5B, when the UE moves and is notified that the UE leaves the registered service area from the AMF at step 521, the SMF may determine whether the new location of the UE is an area in which the additional anchor UPF can provide a service at step 523. When the new location is the area in which the additional anchor UPF can provide a service, the SMF may allow the additional anchor UPF to maintain local offloading for the PDU session at step 525. On the other hand, when it is determined that the UE leaves the service area of the additional anchor UPF, the SMF may release the additional anchor UPF from the corresponding PDU session at step 527. When there is an IP address linked to the released additional anchor UPF, the SMF may transmit a notification to prevent the UE to use the IP address at step 529. When the additional anchor UPF performs a BP or UL CL function, the BP or UL CL function may be also released. Thereafter, the SMF may determine whether the intermediate UPF is still needed at step 531. When the intermediate UPF is still need, the SMF may maintain an N9 tunnel between the intermediate UPF and the original anchor UPF for the PDU session at step 533. When the intermediate UPF is not needed, the SMF may remove the N9 tunnel between the intermediate UPF and the original anchor UPF for the PDU session and release the intermediate UPF at step 535.

In addition, when the BS which the UE accesses is changed due to movement of the UE and thus the UE leaves the service area of the existing additional anchor UPF allocated within a specific PDU session and the UE enters a service area of a new additional anchor UPF belonging to the PDU session, the UE may release the existing additional anchor UPF in the PDU session and add the new additional anchor UPF at the same time. The change (relocation) of the additional anchor UPF may be also applied to the following embodiments.

Figure 5C:
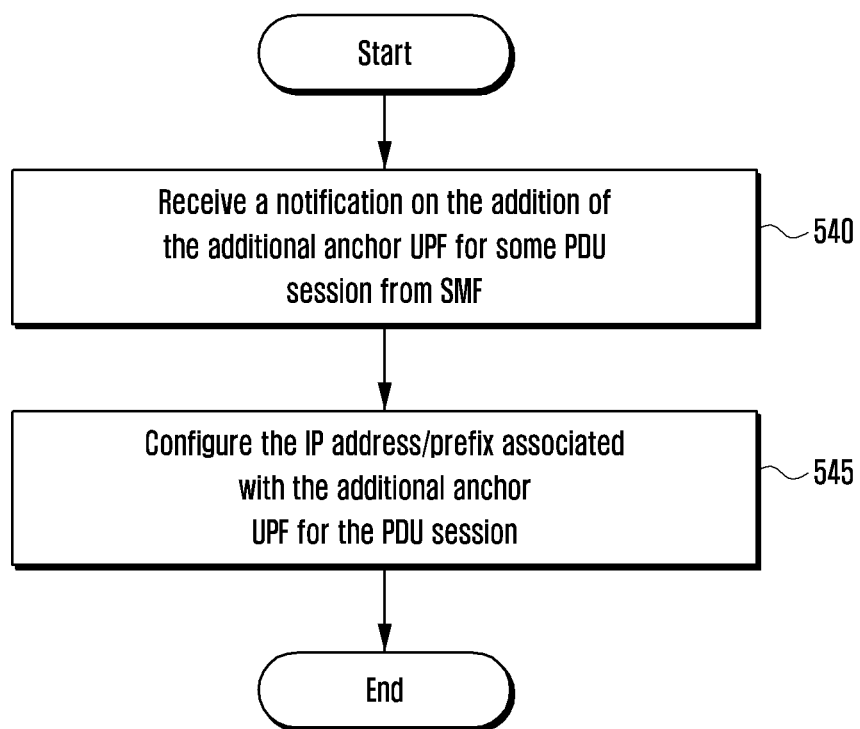
FIG. 5C is a flowchart of an internal operation of the UE receiving a notification, according to an embodiment.

FIG. 5C is a flowchart of an internal operation of the UE receiving the notification when the SMF adds the additional anchor UPF for local offloading for the PDU session and transmits a notification to the UE, according to an embodiment.

The UE may receive a notification message about the addition of the additional anchor UPF for the PDU session from the SMF at step 540. The notification message may include PDU session identification information (e.g., PDU session ID), additional anchor UPF identification information, and a traffic rule for local offloading (e.g., 5-tuple). The UE having received the notification message may update the IP address linked to the additional anchor UPF of the corresponding PDU session in its own routing table and transmit traffic through the IP address for the traffic that matches the traffic rule for local offloading at step 545.

Figure 6:
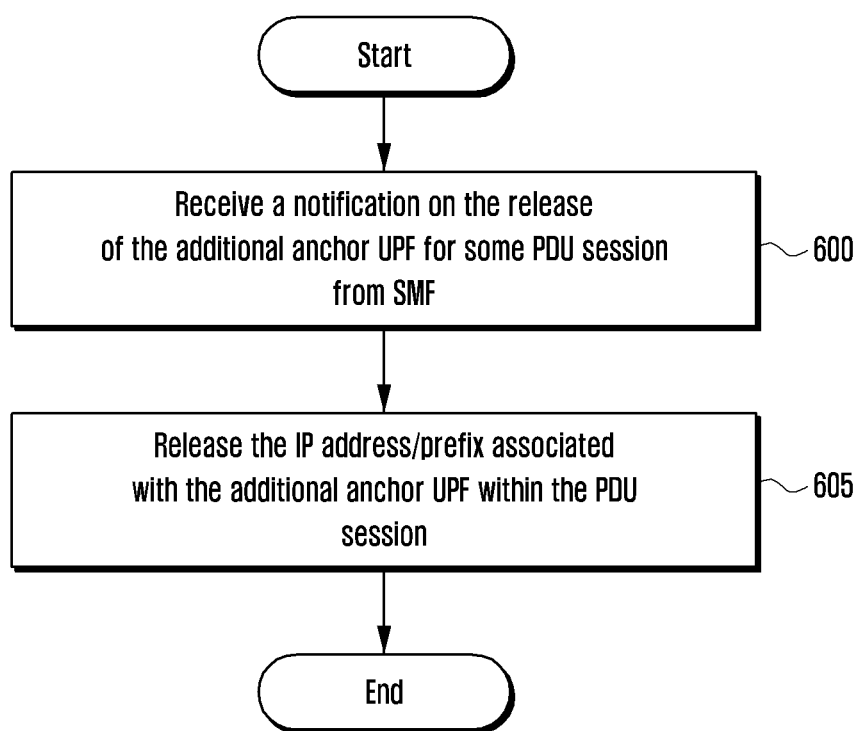
FIG. 6 is a flowchart of an internal operation of the UE receiving a notification, according to an embodiment.

FIG. 6 is a flowchart of an internal operation of the UE receiving the notification when the SMF releases the additional anchor UPF for local offloading from the PDU session and transmits a notification to the UE, according to an embodiment.

The UE may receive a notification message about the release of the additional anchor UPF for the PDU session from the SMF at step 600. The notification message may include PDU session identification information (e.g., PDU session ID) and additional anchor UPF identification information. The UE having received the notification message may release the IP address linked to the additional anchor UPF of the corresponding PDU session and may not use the corresponding IP address any more for new traffic at step 605.

Figure 7B:
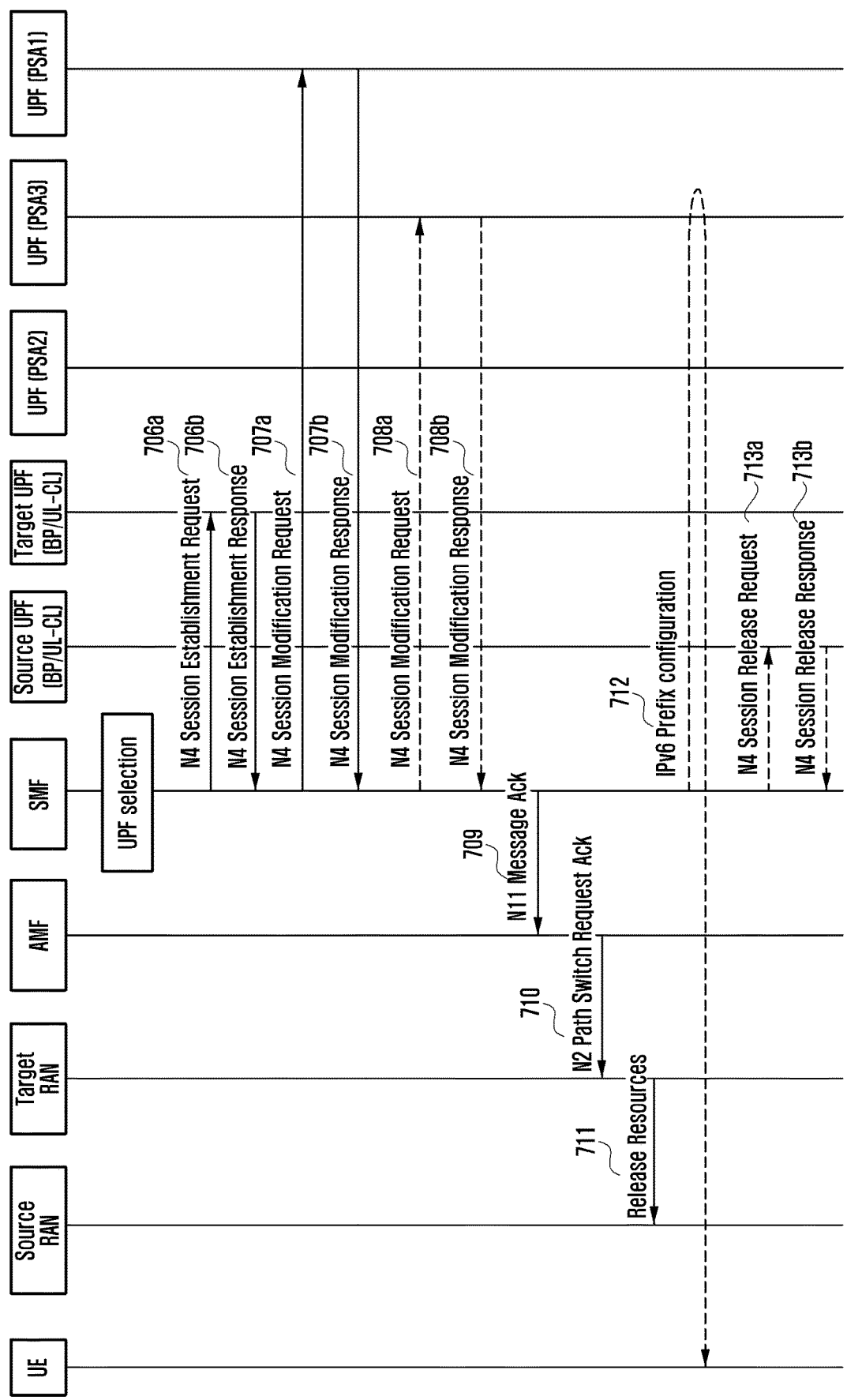

FIGS. 7A and 7B are diagrams of an Xn-based handover procedure including a process of adding or releasing the additional anchor UPF to or from the PDU session when the UE performs the handover, according to an embodiment.

In FIGS. 7A-7B, an Xn-based handover procedure including a process of adding or releasing the additional anchor UPF for local offloading to the PDU session when the UE in a CM-CONNECTED state performs the handover is described. The UE in the CM-CONNECTED state which can perform a signal exchange through the setup of NAS signaling connection with the AMF of the 5G core network may be in a state in which the UE has set up at least one PDU session with at least one (original) anchor UPF including the PDU session.

Referring to FIGS. 7A and 7B, when the UE in the CM-CONNECTED state performs the handover through an Xn interface between BSs from a source BS to a target BS, the target BS may transmit an N2 path switch request message to the AMF at step 701. The AMF may be informed of the successful handover of the UE to the target BS through the N2 path switch request message and a list of PDU sessions (e.g., including PDU session IDs) successfully switched to the target BS may be transmitted together. Further, for a quality of service (QoS) flow switched to the target BS, the N2 path switch request message may also include a list of QoS flows allowed for each PDU session.

Thereafter, the AMF may transmit an N11 message to the SMF in charge of each PDU session from the list of PDU sessions included in the N2 path switch request at step 702. The N11 message may include UE identification information, BS identification information (e.g., an RAN ID or a cell ID), PDU session identification information, UE location information (e.g., identification information in the unit of tracking areas (TAs) to which the target BS belongs), and access type information. When two or more PDU sessions are controlled by different SMFs, the AMF may separately generate N11 messages and transmit the generated messages to the respective SMFs. When network entities of the 5G network provide a service interface, the N11 message may be replaced with an operation of a service provided from the AMF or the SMF.

When it is determined that there is no connectivity with the additional anchor UPF (e.g., PSA2 of FIG. 7A) for local offloading with the target BS for the PDU session included in the N11 message, the SMF having received the N11 message may release the additional anchor UPF. Particularly, in an IPv6 Multi-homed PDU session, the SMF may additionally generate a message for IPv6 Prefix setup in order to invalidate an IPv6 Prefix associated with the additional anchor UPF. The SMF may configure a lifetime of the IPv6 Prefix to be invalidated as zero and transmit an IPv6 router advertisement (RA) message to the UE at step 703. The IPv6 RA message may be generated by the SMF at a time point at which DL data transmission is possible and transmitted to the UE.

In order to release the additional anchor UPF, the SMF may transmit an N4 session release request to the corresponding UPF at step 704a. The N4 session release request may include information for identifying the PDU session of the UE (e.g., an N4 session ID) and a release cause value. The release cause may indicate that the UE leaves the service area of the corresponding UPF. Information for releasing the IP address/prefix associated with the corresponding UPF may be also included. The UPF having received the N4 session release request may discard remaining packets of the corresponding PDU session and delete PDU session context including all pieces of tunnel information related to the corresponding PDU session and the IP address/prefix. When the anchor UPF successfully completes the release of the PDU session context, the anchor UPF may generate an N4 session release response to transmit it to the SMF at step 704b. The N4 session release response may include information for identifying the PDU session of the UE such as the N4 session ID like the N4 session release request message.

Meanwhile, when it is determined that a new additional anchor UPF for local offloading can be added at a new location to which the UE moves for a specific PDU session, the SMF may perform the N4 session setup procedure with the new additional anchor UPF (e.g., PSA3 of FIG. 7A). Specifically, the SMF may transmit an N4 session establishment request to the new additional anchor UPF at step 705a. The N4 session establishment request may include information for identifying the PDU session as well as information on N4 session context to be installed in the UPF. The N4 session context information may include a packet detection rule including information on a rule for identifying a packet (which arrives at the UPF), a forwarding action rule including a rule about packet processing (forwarding/drop/buffering), a usage reporting rule for collecting information on packet charging and usage, and a QoS enforcement rule including information on QoS requirements of the corresponding PDU session (e.g., maximum rate enforcement). In order to identify the PDU session, the SMF may generate an N4 session ID and store mapping of the PDU session and the N4 session ID. When the SMF allocates a new IP address/prefix, such information may be also included.

When the UPF having received the N4 session establishment request message sets up a tunnel for the corresponding PDU session and completes the establishment of the association with the IP address/prefix, the UPF may transmit an N4 session establishment response to return the generated tunnel identification information (e.g., a tunnel endpoint ID (TEID)) to the SMF at step 705b. Identification information (e.g., the N4 session ID) generated to identify the corresponding PDU session may be transmitted.

When the SMF manages the PDU session in which a plurality of anchor UPFs including the new additional anchor UPF exist, the SMF may additionally select an intermediate UPF (e.g., the target UPF of FIG. 7A) that provides a BP/UL CL function for dividing or adding traffic between the BS and the anchor UPF. The intermediate UPF may be selected from UPFs having connectivity with the target BS and all anchor UPFs, and the selection of the UPF may be performed based on various parameters which the SMF can consider such as UE location information, a UPF load state, UPF location information, and UPF capacity. When the SMF selects the intermediate UPF, the SMF may perform the N4 session setup procedure with the intermediate UPF and perform the N4 session modification procedure with the anchor UPFs in order to update a data transmission path for the PDU session. Further, the SMF may transmit a (e.g., 5-tuple-based) traffic routing filter rule for the BP/UL CL function to the intermediate UPF. The N4 session setup procedure may include step 706a in which the SMF transmits N4 session establishment request signaling including an identification address of the target BS, an identification address of the anchor UPF, and tunnel identification information required for the N9 tunnel setup to the intermediate UPF and step 706b in which the intermediate UPF transmits N4 session establishment response signaling including an identification address of the intermediate UPF and tunnel identification information required by the intermediate UPF for the N9 tunnel setup with the anchor UPF and an identification address of the intermediate UPF and tunnel identification information required for the N3 tunnel setup with the target BS to the SMF. Thereafter, the SMF may provide information (e.g., the identification address of the intermediate UPF and the tunnel identification information) for the N9 tunnel setup with the intermediate UPF to the anchor UPFs (e.g., PSA1 and PSA3 of FIG. 7A) through an N4 session modification procedure at steps 707a, 707b, 708a, and 708b).

Next, the SMF may transmit N2 path switch acknowledge (ACK) message including the PDU session identification information and core network (CN) tunnel information for the N3 tunnel setup between the intermediate UPF and the target BS to the AMF at step 709. The AMF may transmit, to the target BS, N2 session information (including CN tunnel identification information of the corresponding PDU session) included in the N11 message received from the SMF at step 710. When the AMF generates a plurality of N11 messages, the AMF may wait for response messages for a specific time in order to receive responses to all of the plurality of N11 messages and transmit the gathered response messages to the target BS at a time.

Thereafter, the target BS may transmit release resources signaling to the source BS through the Xn interface in order to release UE context at step 711. The source BS having received the release resources may identify the successful handover to the target BS and release resources related to the UE.

When the new additional anchor UPF is added through the Xn-based handover, the UE may be notified of a new IP address/prefix. When an IPv6 Multi-homed PDU session, the SMF may transfer the newly allocated IPv6 prefix to the UE through the UP path by generating an IPv6 RA message together with routing information (e.g., range information of a specific destination IP address) for local offloading at step 712.

When the SMF changes the intermediate UPF from the source UPF to the target UPF, the SMF may generate signaling for releasing the N4 session with the source UPF at a time point at which a timer value set when the N4 session setup with the target UPF is completed at step 706b expires. The SMF may transmit an N4 session release request message to the source UPF together with a release cause at step 713a and, when the release is completed, the source UPF may generate an N4 session release response message in order to transmit it at step 713b.

The name of the signal message can be changed, and the signal order may be changed or signaling may be integrated according to requirements such as handover performance optimization.

Figure 8A:
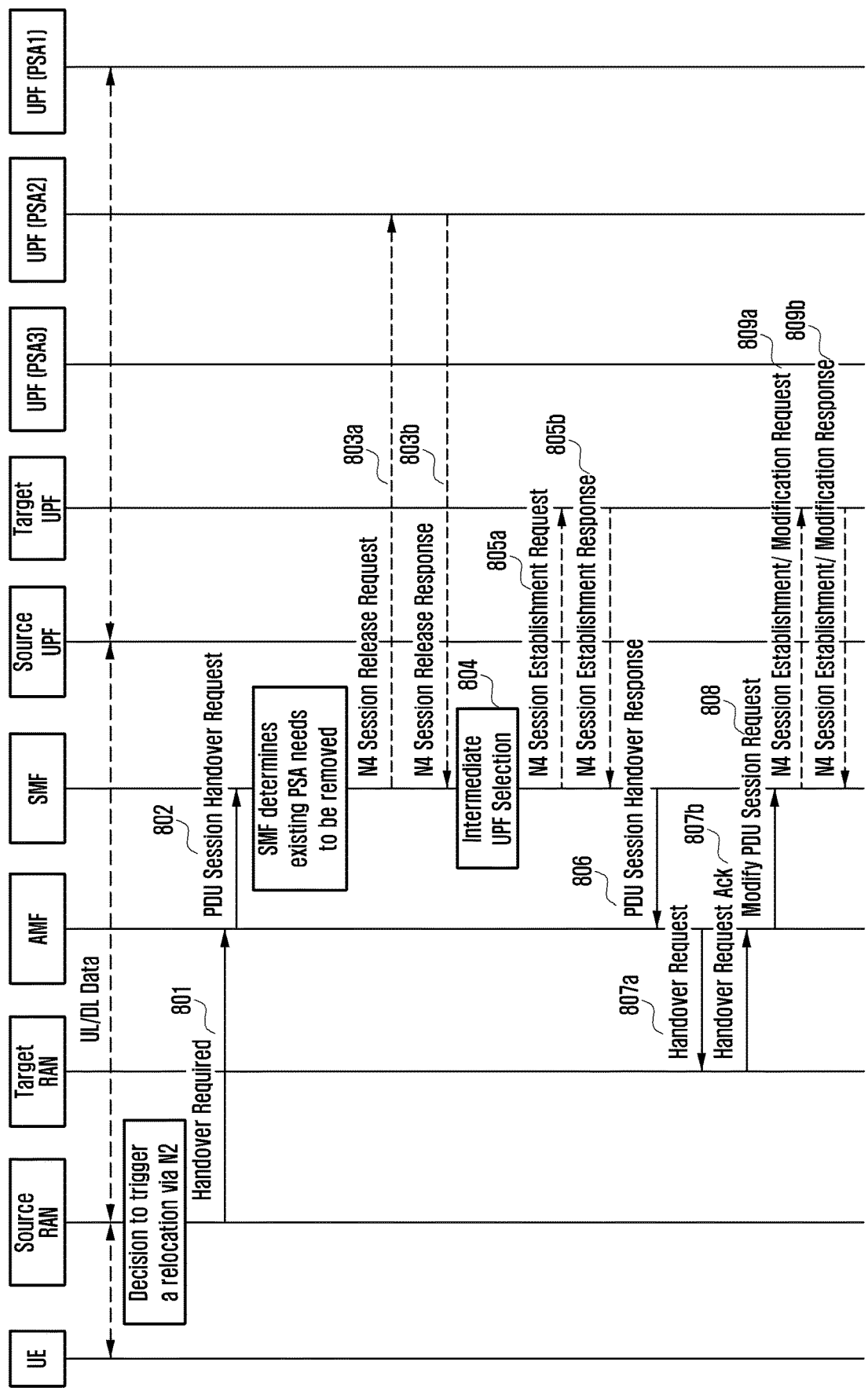
FIGS. 8A and 8B are diagrams of an N2-based handover procedure, according to an embodiment.
Figure 8B:
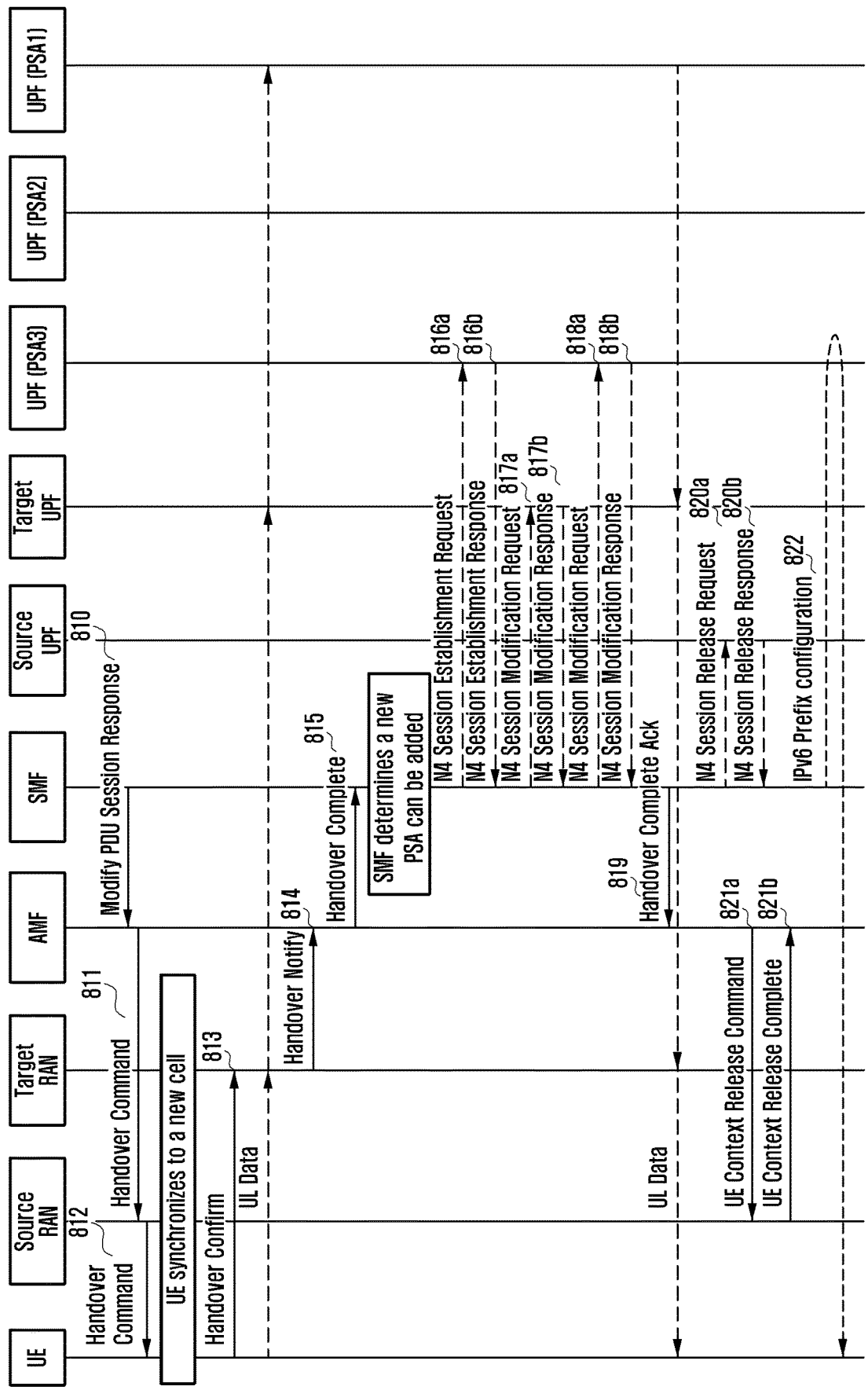

FIGS. 8A and 8B are diagrams of an N2-based handover procedure including a process of adding or releasing the additional anchor UPF to or from the PDU session when the UE performs the handover, according to an embodiment.

In FIGS. 8A and 8B an N2-based handover procedure including a process of adding or releasing the additional anchor UPF to the PDU session when the UE in a CM-CONNECTED state performs the handover is described. The procedure may be implemented when there is no Xn interface between the source BS and the target BS. The UE in the CM-CONNECTED state in which an NAS signaling connection with the AMF of the 5G core network is maintained may have already set up one PDU session with at least one (original) anchor UPF.

Referring to FIGS. 8A and 8B, the source BS may select a target BS suitable for the handover of the UE based on a UE feedback (e.g., a measurement report) and transmit a handover request message including identification information of the target BS (e.g., an RAN ID or a cell ID) and identification information of the PDU session (e.g., PDU session ID(s)) which the UE currently uses to the AMF at step 801. The used PDU session may be a session in which a UL or DL data packet can be transmitted since a user plane (UP) data transmission path has been already set up between the UE and the anchor UPF. The AMF may transmit a PDU session handover request message to the SMF for controlling the PDU session which the UE is using at step 802. When two or more PDU sessions are controlled by different SMFs, the AMF may separately generate PDU session handover request messages and transmit the generated messages to the respective SMFs. When it is determined that the UE located in the target BS leaves the service area of the additional anchor UPF (PSA2 of FIG. 8A) for local offloading of the PDU session, the SMF having received the PDU session handover request message may release the additional anchor UPF. Particularly, when an IPv6 Multi-homed PDU session, the SMF may additionally generate a message for IPv6 Prefix setup in order to invalidate an IPv6 Prefix associated with the additional anchor UPF. The SMF may configure a lifetime of the IPv6 Prefix to be invalidated as zero and transmit an IPv6 RA message to the UE. The IPv6 RA message may be generated by the SMF at a time point at which DL data transmission is possible and transmitted to the UE.

In order to release the additional anchor UPF, the SMF may transmit an N4 session release request to the corresponding UPF at step 803*a*. The N4 session release request may include information for identifying the PDU session of the UE (e.g., an N4 session ID) and a release cause value. The release cause may indicate that the UE leaves the service area of the corresponding UPF. Further, information for releasing the IP address/prefix associated with the corresponding UPF may be also included. The UPF having received the N4 session release request may discard remaining packets of the corresponding PDU session and delete PDU session context including all pieces of tunnel information related to the corresponding PDU session and the IP address/prefix. When the UPF successfully completes the release of the PDU session context, the UPF may generate an N4 session release response to transmit it to the SMF at step 803*b*. The N4 session release response may include information for identifying the PDU session of the UE such as the N4 session ID.

Thereafter, an intermediate UPF for making connectivity between the target BS and the original anchor UPF (e.g., PSA1 of FIG. 8A) may be selected at step 804. The intermediate UPF may be selected from UPFs having connectivity with both the target BS and the anchor UPF, and the selection of the UPF may be performed based on various parameters which the SMF can consider such as UE location information, a UPF load state, UPF location information, and UPF capacity. When the intermediate UPF is selected, the SMF may perform an N4 session setup procedure with the intermediate UPF in order to update a data transmission path for the PDU session at steps 805*a* and 805*b*. The N4 session setup procedure may include a step in which the SMF transmits N4 session establishment request signaling including an identification address of the target BS, an identification address of the anchor UPF, and tunnel identification information required for the N9 tunnel setup to the intermediate UPF, as well as a step in which the intermediate UPF transmits N4 session establishment response signaling including an identification address of the intermediate UPF and tunnel identification information required by the intermediate UPF for the N9 tunnel setup with the anchor UPF and an identification address of the intermediate UPF and tunnel identification information required for the N3 tunnel setup with the target BS to the SMF.

Next, the SMF may transmit a PDU session handover response message including the PDU session identification information and CN tunnel information for the N3 tunnel setup between the intermediate UPF and the target BS to the AMF at step 806.

The AMF may transmit a handover request message including the PDU session handover response message received from the SMF to the target BS at step 807*a*. When a plurality of PDU session handover response messages are generated, the AMF may wait for the response message for a particular time in order to receive all of them and transmit the gathered response messages to the target BS at a time. When receiving the handover request message, the target BS may perform an operation of allocating resources for the N3 tunnel setup with the intermediate UPF for the PDU session which can be allocated by the target BS. Further, the target BS may transmit a handover request ACK message including RAN tunnel information of the session (e.g., an identification address of the target BS and tunnel identification information) together with identification information of the corresponding session (e.g., the PDU session ID) to the AMF at step 807*b*. The handover request ACK message may include identification information of the corresponding session for the PDU session, which cannot be allowed by the target BS, and a cause indicator.

When receiving the handover request ACK message, the AMF generates a modify PDU session request message and transmits it to the SMF for controlling the corresponding PDU session based on identification information of the PDU session at step 808. The modify PDU session request message may include information which varies depending on whether the target BS allows the PDU session. For the PDU session which is allowed by the target BS, RAN tunnel information which the target BS sets up for the N3 tunnel may be included. Thereafter, the SMF may provide RAN tunnel information to the intermediate UPF through the N4 session modification procedure and complete the N3 tunnel setup at steps 809*a* and 809*b*. Additionally, when the N4 session establishment procedure is performed first at steps 805*a* and 805*b*, the SMF may perform the N4 session establishment procedure instead of the N4 session modification procedure. Meanwhile, for the PDU session which is not allowed by the target BS, the SMF may perform a request for releasing N3 and N9 tunnel resources set up at steps 805*a* and 805*b* to the intermediate UPF. The SMF may additionally perform the PDU session release procedure for the PDU session which is not allowed by the target BS.

Thereafter, the SMF may transmit the modify PDU session response message to the AMF at step 810. Then, the AMF may transmit a handover command message to the source BS at step 811. The handover command message may separately include session identification information that is allowed by the target BS and session identification information that is not allowed by the target BS. When it is determined to perform the handover to the target BS, the source BS transmits the handover command message to the UE at step 812 and the UE performs synchronization with the target BS and transmits a handover confirm message indicating the successful handover to the target BS at step 813.

Thereafter, the target BS transmits a handover notify message including identification information in the unit of TAs (e.g., a tracking area identifier (TAI)) to which the target BS belongs and BS identification information (e.g., an RAN ID or a cell ID) to the AMF at step 814. When the AMF having received the handover notify message manages an active/inactive state according to the existence or nonexistence of UP connection for each PDU session of the UE, the AMF transmits, to the activated PDU session, a handover complete message to the SMF corresponding to the PDU session at step 815. Meanwhile, when the AMF does not manage the UP connection state for each PDU session of the UE, the handover notify message may include identification information of the PDU session (e.g., a PDU session ID) for which the target BS sets up the UP connection. Then, the AMF may transmit the handover complete message to the corresponding SMF through the PDU session identification information.

The SMF having received the handover complete message may recognize the successful handover. Then, the SMF may determine whether a new additional anchor UPF for local offloading can be added at the current location of the UE for each PDU session. When the new additional anchor UPF (e.g., PSA3 of FIG. 8B) can be added, the SMF may perform the N4 session setup procedure with the corresponding UPF. Specifically, the SMF may transmit an N4 session establishment request to the UPF at step 816a. When the SMF allocates a new IP address/prefix, such information may be included together. When the UPF having received the request message sets up a tunnel for the corresponding PDU session and completes establishment of the association with an IP address/prefix, the UPF may transmit an N4 session establishment response to the SMF to give an answer at step 816b. Identification information (e.g., the N4 session ID) generated to identify the corresponding PDU session may be transmitted. Alternatively, the N4 session ID may be first generated by the SMF and then transmitted to the UPF.

When the SMF manages the PDU session in which a plurality of anchor UPFs including the new additional anchor UPF exist, the SMF may additionally select an intermediate UPF that provides a BP/UL CL function for dividing or adding traffic between the BS and the anchor UPF. When the intermediate UPF (e.g., the target UPF of FIG. 8B) already included in the PDU session can perform the BP/UL CP function, the SMF may perform the N4 session modification procedure with the intermediate UPF at steps 817a and 817b. The SMF may transmit not only information required for the N3 tunnel setup with the target BS but also information required for the N9 tunnel setup with the new additional anchor UPF to the intermediate UPF. Similarly, the intermediate UPF may return the information required for the N9 tunnel setup to be transmitted to the new anchor UPF. Further, the SMF may transmit a (e.g., 5-tuple-based) routing filter rule for the BP/UL CL function to the intermediate UPF. Thereafter, the SMF may perform the N4 session modification procedure in order to transmit the N9 tunnel setup information received from the intermediate UPF for the N9 tunnel setup with the new additional anchor UPF at steps 818a and 818b.

In addition, when the SMF changes the intermediate UPF from the source UPF to the target UPF, when a timer value set at a time point at which the N4 session setup with the target UPF is completed at step 805b or 809b, the SMF may generate signaling for releasing the N4 session with the source UPF. The SMF may transmit an N4 session release request message to the source UPF together with a release cause at step 820a and, when the release is completed, the source UPF may generate an N4 session release response message to give an answer at step 820b.

In addition, the SMF may transmit ACK in response to the handover complete message to the AMF at step 819. The AMF having received the ACK may transmit a UE context release command message to the source BS in order to release UE context in the source BS at step 821a. The source BS returns a UE context release complete message to the AMF after releasing the UE context at step 821b.

When the new additional anchor UPF is added through the N2-based handover, the UE may be notified of a new IP address/prefix. When the IPv6 Multi-homed PDU session, the SMF may generate an IPv6 Router Advertisement together with routing information for local offloading of the newly allocated IPv6 prefix and transmit them to the UE through a UP path at step 822.

The name of the signaling message used can be changed, and the order of some signaling may be changed or signaling may be integrated according to requirements such as handover performance optimization.

Figure 9B:
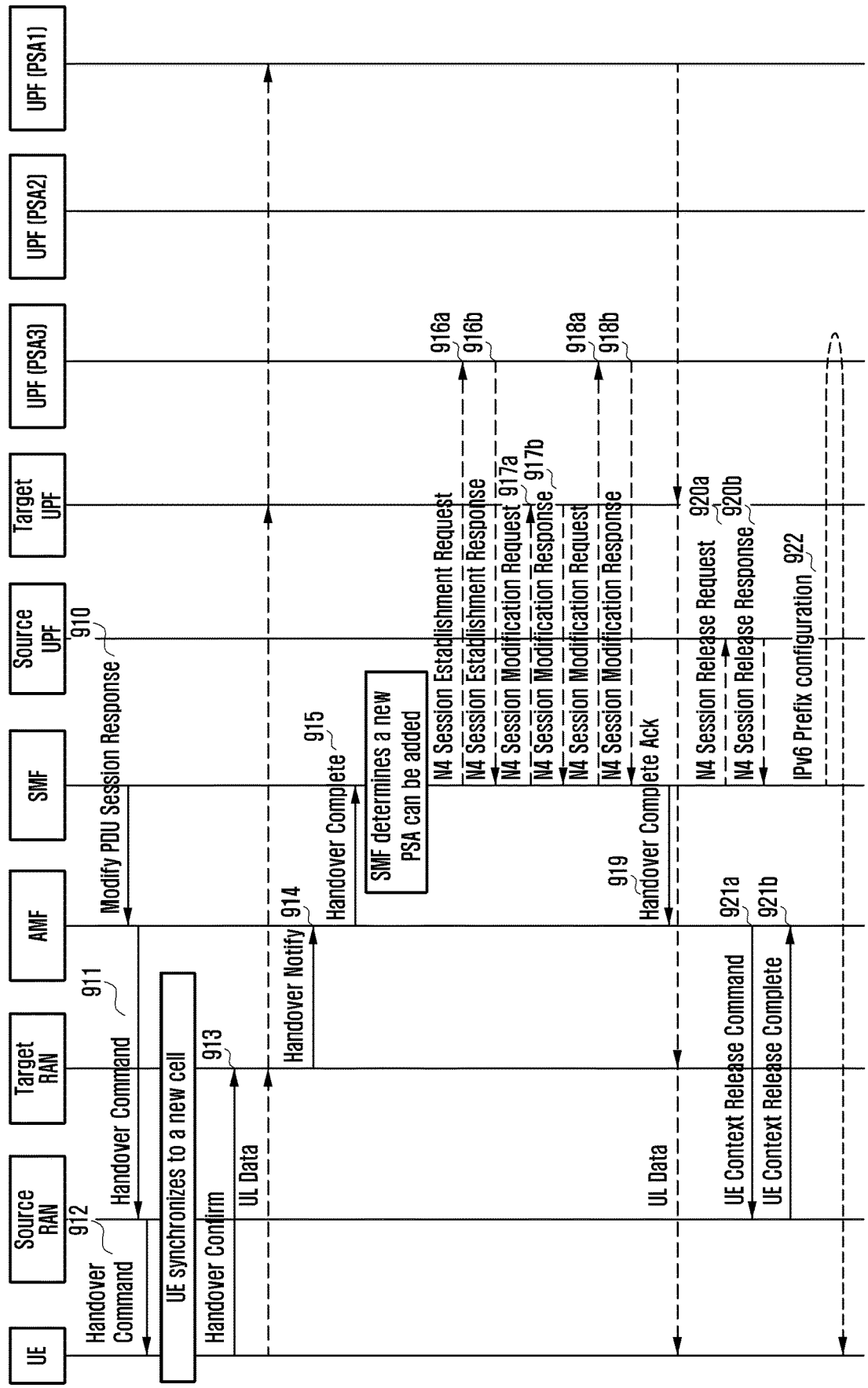

FIGS. 9A and 9B are diagrams of an N2-based handover procedure including a process of adding or releasing the additional anchor UPF to or from the PDU session when the UE performs the handover, according to an embodiment.

In FIGS. 9A and 9B, an N2-based handover procedure including a process of adding or releasing the additional anchor UPF to the PDU session when the UE in a CM-CONNECTED state performs the handover is described. Referring to FIGS. 9A and 9B, the procedure differs in that the operation of releasing the additional anchor UPF in the PDU session which the UE sets up at steps 908a and 908b is performed after reception of the handover request ACK from the target BS at step 906b. A detailed call flow is illustrated in FIGS. 9A and 9B. Except for the difference in the time point at which the operation of releasing the additional anchor UPF is performed, the operation from step 901 to step 922 is the same as the operation of steps corresponding to those in FIGS. 8A and 8B.

Figure 10A:
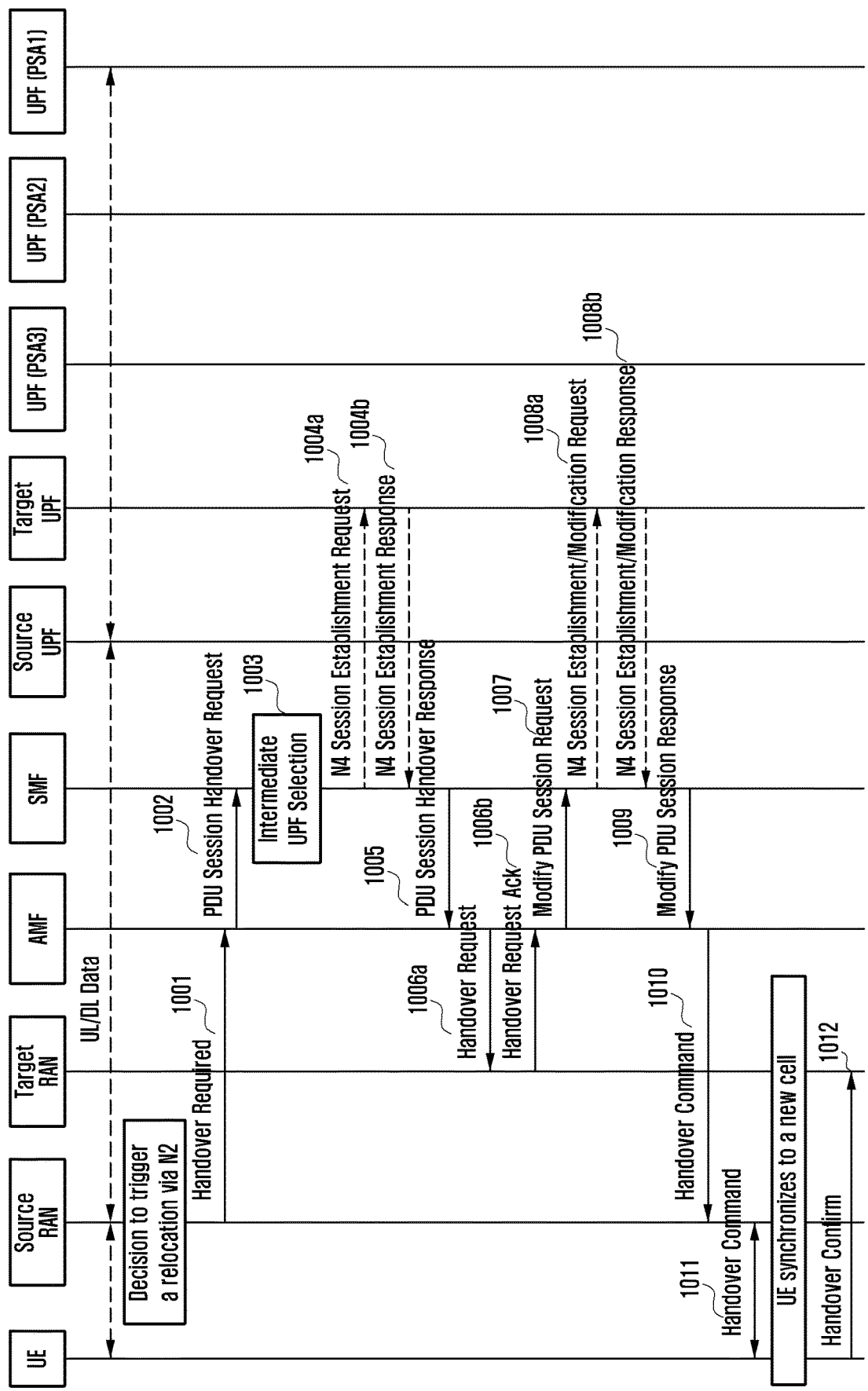
FIGS. 10A and 10B are diagrams of an N2-based handover procedure, according to an embodiment.
Figure 10B:
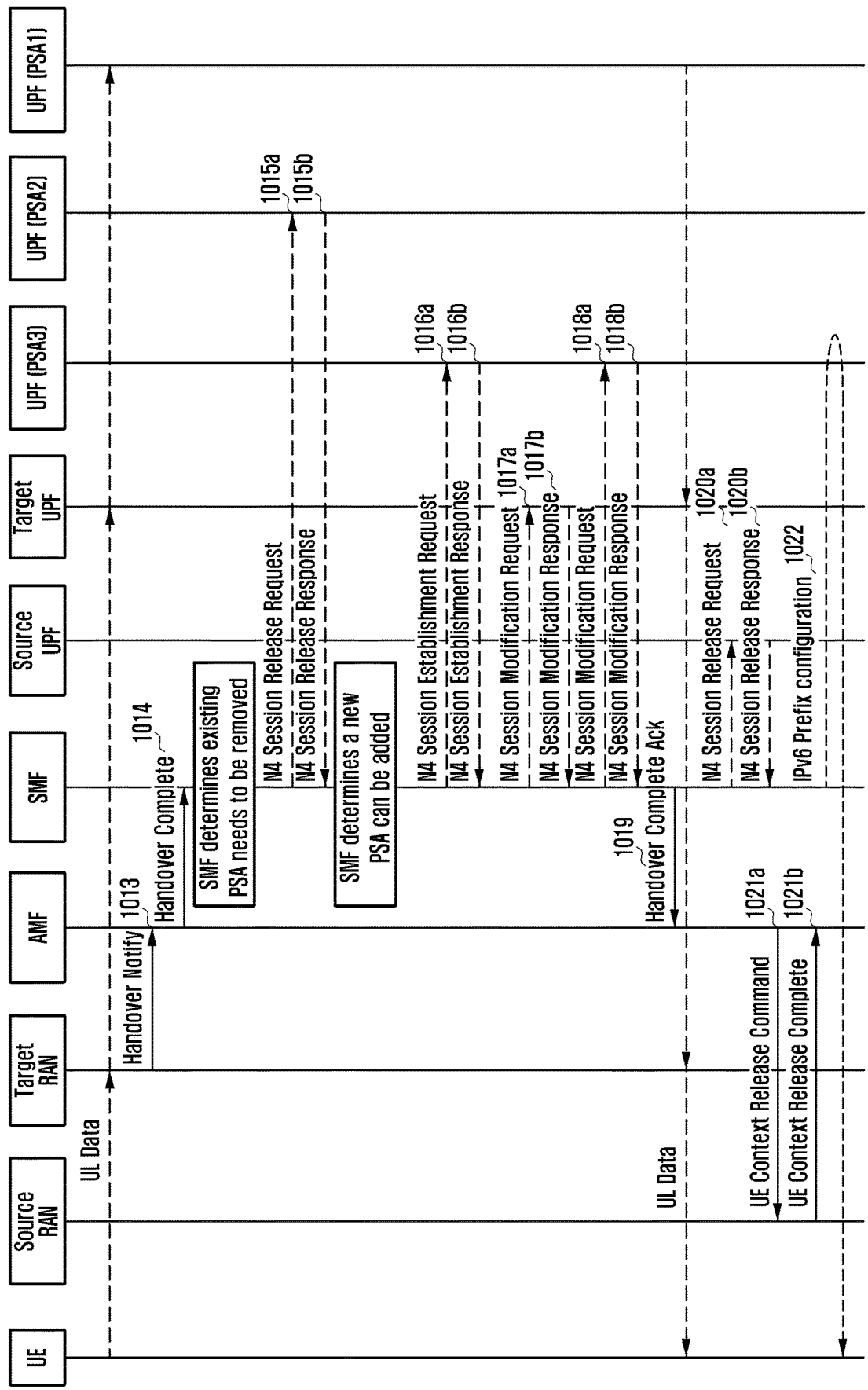

FIGS. 10A and 10B are diagrams of an N2-based handover procedure including a process of adding or releasing the additional anchor UPF to or from the PDU session when the UE performs the handover, according to an embodiment.

In FIGS. 10A and 10B, an N2-based handover procedure including a process of adding or releasing the additional anchor UPF to the PDU session when the UE in a CM-CONNECTED state performs the handover is described. Referring to FIGS. 10A and 10B, the procedure differs in that the existing additional anchor UPF is released for the PDU session which the target BS successfully sets up at the time point at which the UE completes the handover to the target BS at steps 1015a and 1015b and the new additional anchor UPF is added. A detailed call flow is illustrated in FIGS. 10A and 10B. Except for the difference in the time point at which the operation of releasing the additional anchor UPF is performed, the operation from step 1001 to step 1022 is the same as the operation of steps corresponding to those in FIGS. 8A and 8B or FIGS. 9A and 9B.

Figure 11A:
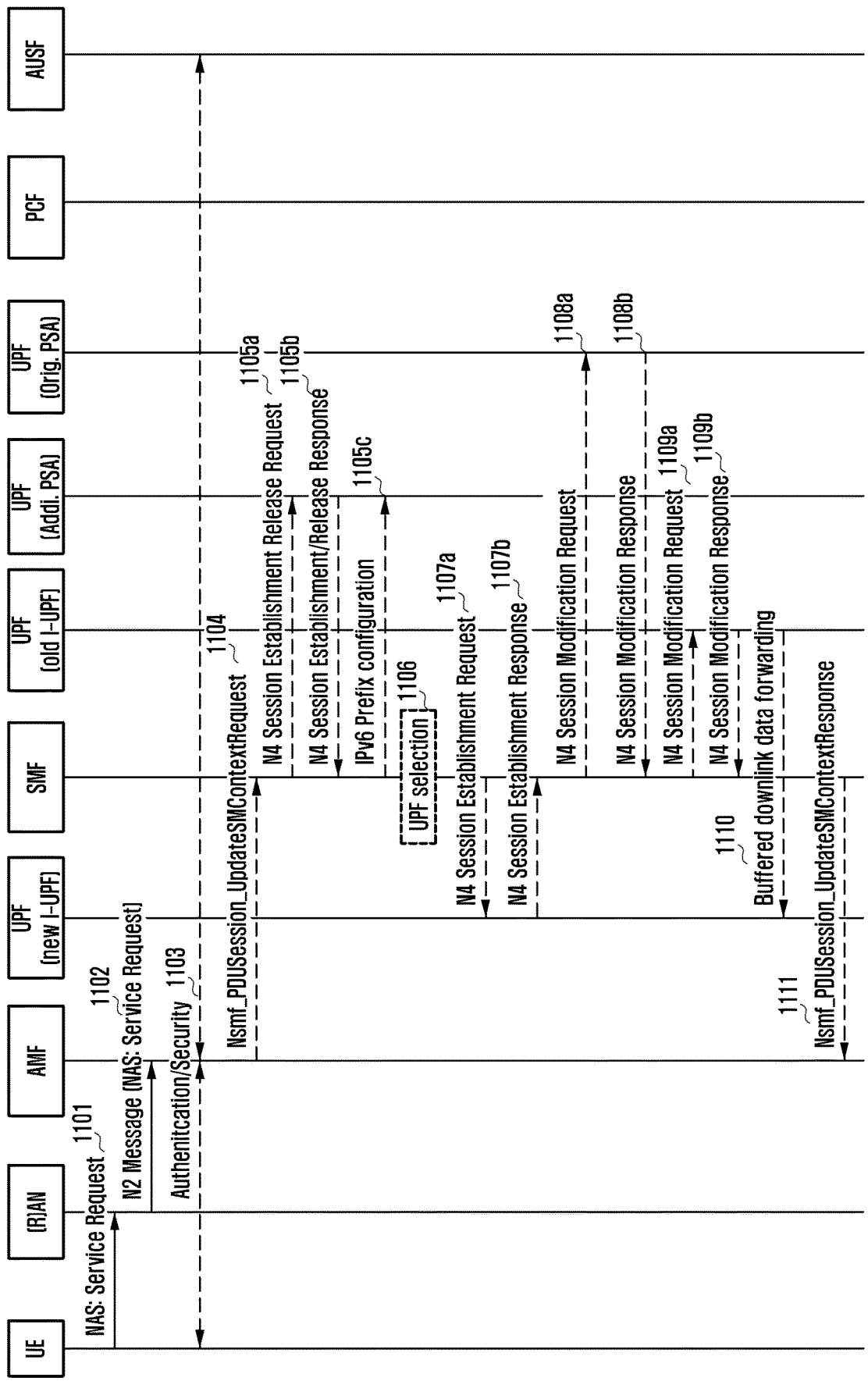
FIGS. 11A and 11B are diagrams of a service request procedure, according to an embodiment.
Figure 11B:
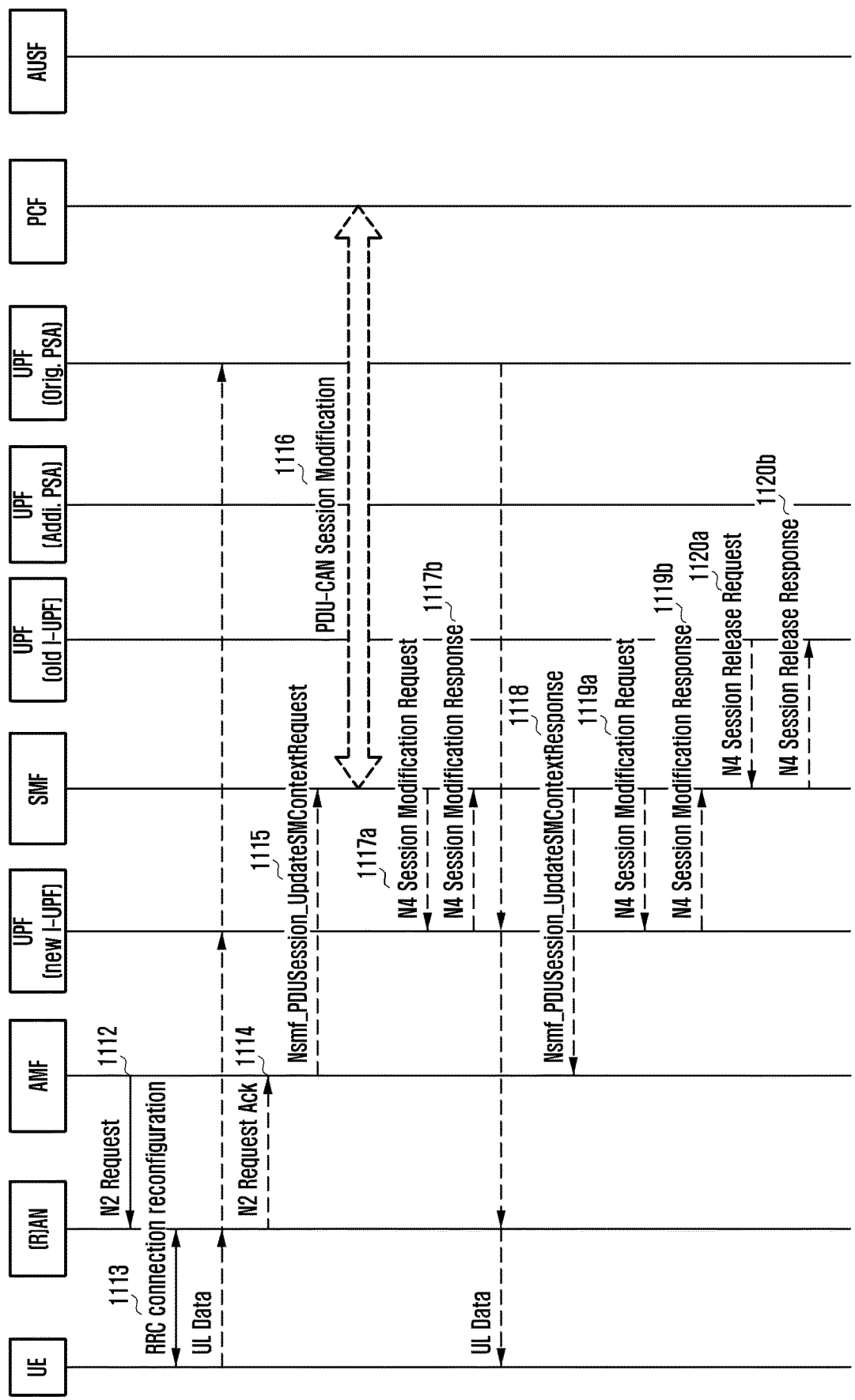

FIGS. 11A and 11B are diagrams of a service request procedure including a process of adding a new additional anchor UPF to the already set up PDU session or releasing the conventionally added additional anchor UPF when the UE in a CM-IDLE state performs a service request, according to an embodiment.

In FIGS. 11A and 11B, a service request procedure including a process of adding the additional anchor UPF for local offloading to the PDU Session which the UE has already set up or releasing the additional anchor UPF, which has been conventionally added, when the UE in a CM-IDLE state performs the service request is described.

Referring to FIGS. 11A and 11B, when the UE is required to activate a UP path of a specific PDU session due to the generation of uplink data traffic, the UE transmits a service request message together with identification information of the corresponding PDU session (e.g., a PDU session ID) through NAS signaling at step 1101. The NAS signaling is transmitted to the AMF via the RAN, and the RAN may transmit location information and identification information thereof (including a cell ID, a RAN ID, identification information in the unit of tracking areas to which the BS belongs, and an access type) together with the NAS signaling through an N2 message at step 1102. The AMF having received the N2 message may perform an authentication and encryption procedure with the UE having transmitted the NAS signaling as necessary at step 1103.

Thereafter, the UPF transmits an N11 message for activating a UP transmission path of the PDU session to the SMF that manages the corresponding PDU session based on PDU session identification information included in the service request message at step 1104. Here, activating refers to setting up again the UP transmission path, which has been released (i.e., allocating resources for the tunnel setup and exchanging information). Further, when network entities of the 5G network provide a service interface as shown in FIGS. 11A and 11B, the N11 message may be replaced with an operation of a service provided by the AMF or the SMF.

The SMF having received the N11 message may determine whether the UE enters a service area of the additional anchor UPF for local offloading or leaves the service area of the additional anchor UPF for the corresponding PDU Session based on identification information and location information of the RAN which the UE currently accesses. When it is determined that the location of the UE accessing the BS pertains to the service area of the additional anchor UPF, the additional anchor UPF may be added. Further, when it is determined that the location of the UE accessing the BS leaves the service area of the additional anchor UPF, the additional anchor UPF may be released.

In order to add the additional anchor UPF, the SMF may transmit an N4 session establishment request to the corresponding UPF at step 1105a. The N4 session establishment request may include PDU session identification information of the UE (e.g., the N4 session ID) and information on N4 session context to be installed in the UPF. The N4 session context information may include a packet detection rule including information on a rule for identifying a packet, which arrives at the UPF, a forwarding action rule including a rule about packet processing (forwarding/drop/buffering), a usage reporting rule for collecting information on packet charging and usage, and a QoS enforcement rule including information on QoS requirements of the corresponding PDU session (e.g., maximum rate enforcement). Further, when the SMF allocates a new IP address/prefix, such information may be included together. When the UPF having received the N4 session establishment request message sets up a tunnel for the corresponding PDU session and completes the setup of the association with the IP address/prefix, the UPF may transmit an N4 session establishment response to return the generated tunnel identification information (e.g., a TEID) to the SMF at step 1105b. At this time, identification information (e.g., the N4 session ID) generated to identify the corresponding PDU session may be transmitted.

In order to release the additional anchor UPF, the SMF may transmit an N4 session release request to the corresponding UPF at step 1105a. The N4 session release request may include information for identifying the PDU session of the UE (e.g., an N4 session ID) and a release cause value. The release cause may indicate that the UE leaves the service area of the corresponding UPF. Further, information for releasing the IP address/prefix associated with the corresponding UPF may be also included. The UPF having received the N4 session release request may discard remaining packets of the corresponding PDU session and delete PDU session context including all pieces of tunnel information related to the corresponding PDU session and the IP address/prefix. A packet detection rule, a forwarding action rule, a usage reporting rule, and a QoS enforcement rule related to the PDU session may be also deleted. When the UPF successfully completes the release of the PDU session context, the UPF may generate an N4 session release response to transmit it to the SMF at step 1105b. The N4 session release response may include information for identifying the PDU session of the UE such as the N4 session ID.

Particularly, when the additional anchor UPF is added to the IPv6 multi-homed PUD session, the SMF may transmit the IPv6 prefix associated with the additional anchor UPF to the UE in addition to the PDU session at step 1105c. The SMF generates a RA message in order to transmit the IPv6 prefix, and the UE may also transmit routing information (e.g., a destination address) for properly selecting the IPv6 allocated to the existing PDU session and the newly allocated IPv6 prefix. For example, the RA message may include domain information (e.g., fully qualified domain name (FQDN)) of content which a local server for local offloading can download or an (e.g., 5-tuple-based) IP address range corresponding thereto. The routing information may be provided in advance to the SMF or may be dynamically provided from a PCF that provides a policy for the session. The IPv6 RA message may be transmitted from the SMF to the UE via the additional anchor UPF.

Meanwhile, when the additional anchor UPF is released, the SMF may additionally generate a message for configuring the IPv6 prefix in order to invalidate the IPv6 prefix associated with the additional anchor UPF. In order to configure a lifetime of the IPv6 prefix to be invalidated as zero and transmit an IPv6 RA message to the UE, the configuration of the IPv6 prefix may be first transmitted to the remaining anchor UPF (Orig. PSA of FIGS. 11A and 11B) at step 1105c. When the configuration of invalidating the IPv6 prefix is not transmitted to the UE, the SMF may generate the RA message for re-configuring the IPv6 prefix associated with the remaining anchor UPF (Orig. PSA of FIGS. 11A and 11B) in the PDU session and transmit the generated RA message to the UE. The IPv6 RA message may include routing information for the IPv6 prefix that can be still used and a routing rule for preferentially using the IPv6 prefix. A default route path may be configured or a priority higher than that of the IPv6 prefix determined to be invalidated may be configured.

When the additional anchor UPF is added, the PIv6 RA message may be generated by the SMF and transmitted to the UE via the additional anchor UPF. However, when the additional anchor UPF is released, the PIv6 RA message may be generated by the SMF and transmitted to the UE via the additional anchor UPF or the existing original anchor UPF. When the data transmission path of the PDU session is not set up, the IPv6 RA message may be buffered in the anchor UPF or may be forwarded to the intermediate UPF which can perform buffering. Then, the IPv6 RA message may arrive at the UE from the UPF buffering the IPv6 RA message through the data transmission path of the corresponding PDU session at a time point at which DL data can be transmitted to the UE. Further, when the additional anchor UPF is released, the IPv6 RA message may be first generated and transmitted to the UE before the N4 session release procedure with the additional anchor UPF. As described above, when the data transmission path of the PDU session is not set up, the IPv6 RA message has been transmitted in advance to the additional anchor UPF and buffered.

When the SMF manages the PDU session in which a plurality of anchor UPFs including the new additional anchor UPF exist, the SMF may additionally select an intermediate UPF (e.g., a new I-UPF of FIGS. 11A and 11B) that provides a BP/UL CL function for dividing or adding traffic between the BS and the anchor UPF at step 1106. Thereafter, since the operation related to the addition of the new intermediate UPF is similar to the process at steps 706*a* and 706*b*, a detailed description thereof will be omitted. In addition, when the additional anchor UPF added to the PDU session can directly provide the BP or UL CL function, the process of selecting the new intermediate UPF may be omitted.

Meanwhile, when the additional anchor UPF is released, when the SMF determines that there is connectivity between the BS and the remaining anchor UPF (Orig. PSA of FIGS. 11A and 11B) and there is the intermediate UPF (Old I-UPF of FIGS. 11A and 11B) conventionally set up for the PDU session, the SMF may configure a timer for performing a procedure of releasing it. Further, when the SMF knows that DL data arrives at the corresponding PDU session including the IPv6 RA message (e.g., when the SMF receives a data notification from the UPF), the SMF may perform the N4 session modification procedure with the remaining anchor UPF. Through the N4 session modification procedure, a tunnel through which the existing intermediate UPF (old I-UPF of FIGS. 11A and 11B) forwards buffered data to the anchor UPF (Orig. PSA of FIGS. 11A and 11B) may be set up. Thereafter, the SMF may provide tunnel information for forwarding buffered data by performing the N4 session modification procedure with the existing intermediate UPF. The existing intermediate UPF may directly transmit the buffered data through the data forwarding tunnel set up by the anchor UPF. The SMF may additionally configure a timer for releasing the data forwarding tunnel. Meanwhile, when the SMF determines that there is no connectivity between the BS and the remaining anchor UPF (Orig. PSA of FIGS. 11A and 11B) for the PDU session (e.g., when a direct N3 tunnel cannot be established), the SMF may newly select the intermediate UPF for making the connectivity with the anchor UPF at step 1106. When the intermediate UPF (old I-UPF of FIGS. 11A and 11B) is already included in the PDU session, the new intermediate UPF (new I-UPF of FIGS. 11A and 11B) may be selected only when there is connectivity between the BS and the intermediate UPF.

The new intermediate UPF may be selected from UPFs having connectivity with both the BS and the anchor UPF, and the selection of the UPF may be performed based on various parameters which the SMF can consider such as UE location information, a UPF load state, UPF location information, and UPF capacity. When the SMF selects the intermediate UPF, the SMF may perform the N4 session setup procedure with the intermediate UPF at steps 1107*a* and 1107*b* and perform the N4 session modification procedure with the anchor UPF at steps 1108*a* and 1108*b* in order to update a UP transmission path for the PDU session. When there are a plurality of anchor UPFs including the additional anchor UPF in the PDU session, the SMF may perform the N4 session modification procedure with all of them. The N4 session setup procedure may include a step in which the SMF transmits N4 session establishment request signaling including an identification address of the anchor UPF and tunnel identification information required for the N9 tunnel setup to the intermediate UPF, as well as a step in which the intermediate UPF transmits N4 session establishment response signaling including an identification address of the intermediate UPF and tunnel identification information required by the intermediate UPF for the N9 tunnel setup with the anchor UPF to the SMF. Further, when DL data is generated, the SMF may additionally make a request for the tunnel setup for forwarding buffered data. Thereafter, through the N4 session modification procedure, the SMF may provide information (e.g., the identification information of the intermediate UPF and the tunnel identification information) for the N9 tunnel setup with the intermediate UPF and information on the buffered data forwarding tunnel to the anchor UPF. The anchor UPF having received the information on the data forwarding tunnel may directly forward the buffered data to the intermediate UPF at step 1110.

When the intermediate UPF is already included in the PDU session, the SMF may perform an operation related to the N4 session modification with the existing intermediate UPF instead of the anchor UPF (i.e., steps 1108*a* and 1108*b* instead of steps 1109*a* and 1109*b*).

Next, the SMF may transmit an N11 message including the PDU session identification information and CN tunnel information for the N3 tunnel setup between the intermediate UPF and the BS to the AMF at step 1111. Further, when network entities of the 5G network provide a service interface as illustrated in FIGS. 11A and 11B, the N11 message may be replaced with an operation of a service provided by the SMF.

Thereafter, the AMF transmits an N2 request message including the CN tunnel information and the PDU session identification information received from the N11 message to the BS at step 1112. The AMF may also transmit an NAS message corresponding to service accept. The BS having received the messages allocates resources for the N3 tunnel setup for the corresponding session and transmit the NAS message to the UE. The BS and the UE may perform a radio resource control (RRC) connection reconfiguration to set up a data radio bearer (DRB) that complies with the QoS rule of the corresponding session at step 1113. When the DRB setup is completed, the UE may transmit uplink data to the BS. The BS may transmit an N2 request ACK message including RAN tunnel identification information allocated for the N3 tunnel to the AMF at step 1114.

Thereafter, the AMF may transmit a session management (SM) request message including the RAN tunnel information for the N3 tunnel setup included in the N2 request ACK message to the corresponding SMF at step 1115. Further, when network entities of the 5G network provide a service interface as illustrated in FIGS. 11A and 11B, the SM request message may be replaced with an operation of a service provided by the AMF or the SMF.

Thereafter, the SMF may perform a signaling exchange with the PCF to apply a dynamic policy for the PDU session and register a UE location as necessary at step 1116.

Next, the SMF may perform an N4 session modification procedure to transmit the RAN tunnel information to the intermediate UPF at steps 1117*a* and 1117*b*. When there is no change in the intermediate UPF, the procedure may be performed with the old I-UPF. Transmission of the buffered DL data including the IPv6 RA message may be started.

Thereafter, the SMF may transmit ACK of the SM request message at step 1115 to the AMF at step 1118. Further, when network entities of the 5G network provide a service interface as illustrated in FIGS. 11A and 11B, the response to the SM request message may be replaced with an operation of a service provided by the AMF or the SMF.

When the data forwarding tunnel is set up by the SMF, the N4 session modification procedure for releasing the forwarding tunnel may be performed at a time point of expiration of a timer that is configured when the tunnel is set up at steps 1119a and 1119b.

When there is a change in the intermediate UPF from the old I-UPF to the new I-UPF by the SMF, the SMF may perform an N4 session release procedure with the old I-UPF in order to release PDU session context of the old I-UPF if a time configured to release the old UPF expires at a time point at which the new I-UPF is set up at steps 1120a and 1120b.

Similarly, the name of the signaling message used can be changed, and the order of some signaling may be changed or signaling may be integrated according to requirements such as service request procedure performance optimization.

Figure 12A:
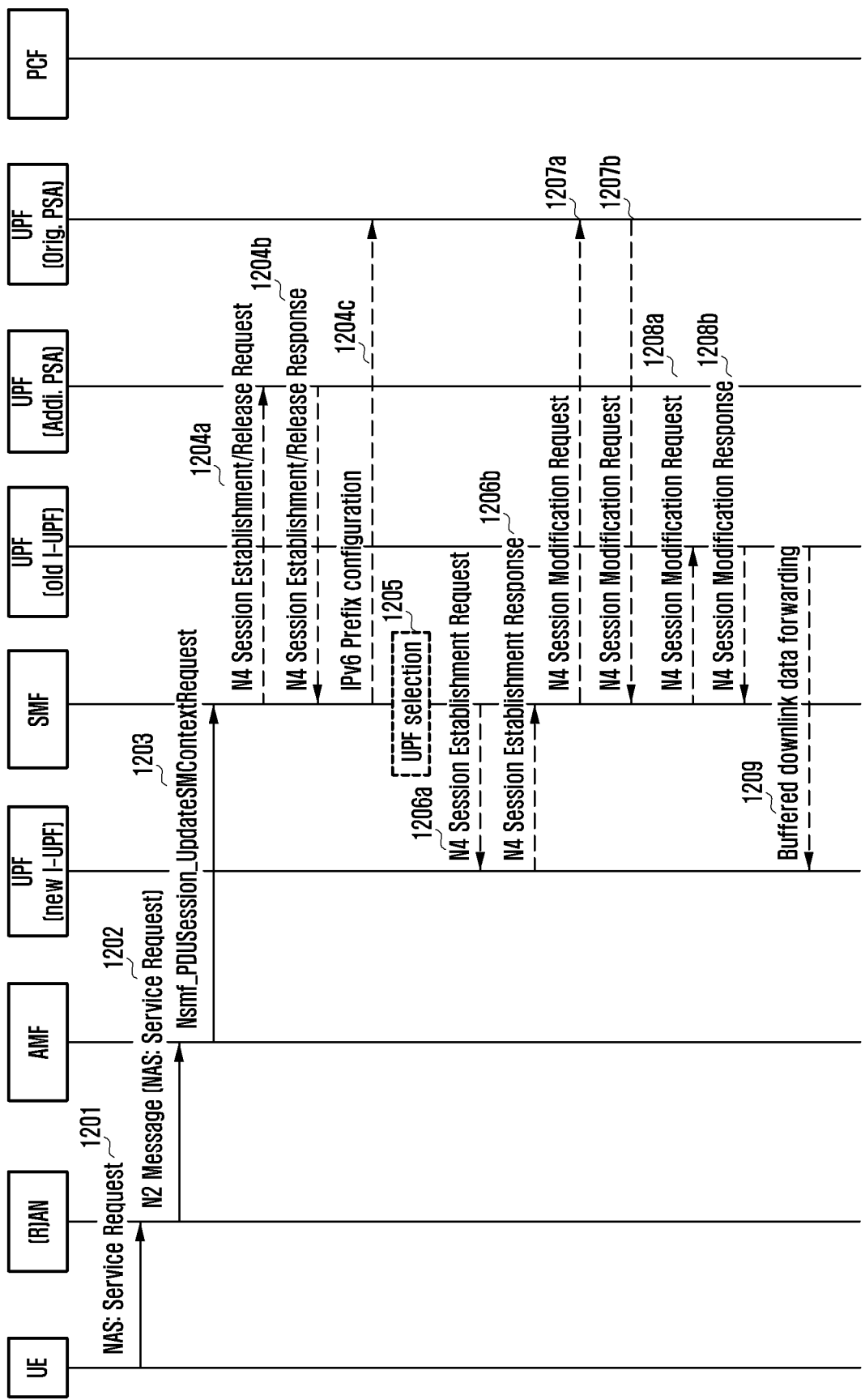
FIGS. 12A and 12B are diagrams of a service request procedure, according to an embodiment.
Figure 12B:
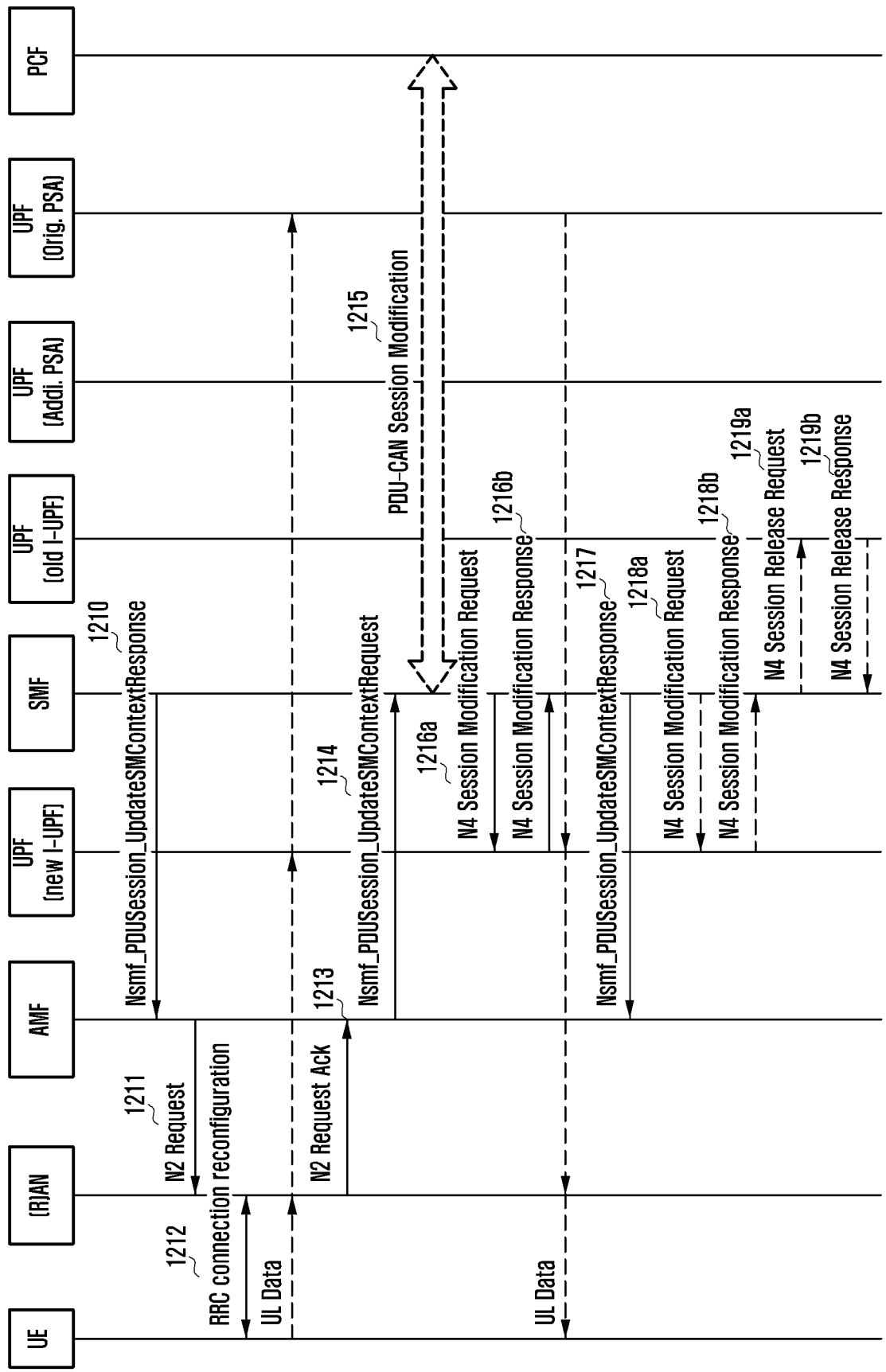

FIGS. 12A and 12B are diagrams of a service request procedure including a process of adding a new additional anchor UPF to the inactive PDU session or releasing the conventionally added additional anchor UPF when the UE in a CM-CONNECTED state performs a service request for the PDU session having no UP connection, according to an embodiment.

Figure 13:
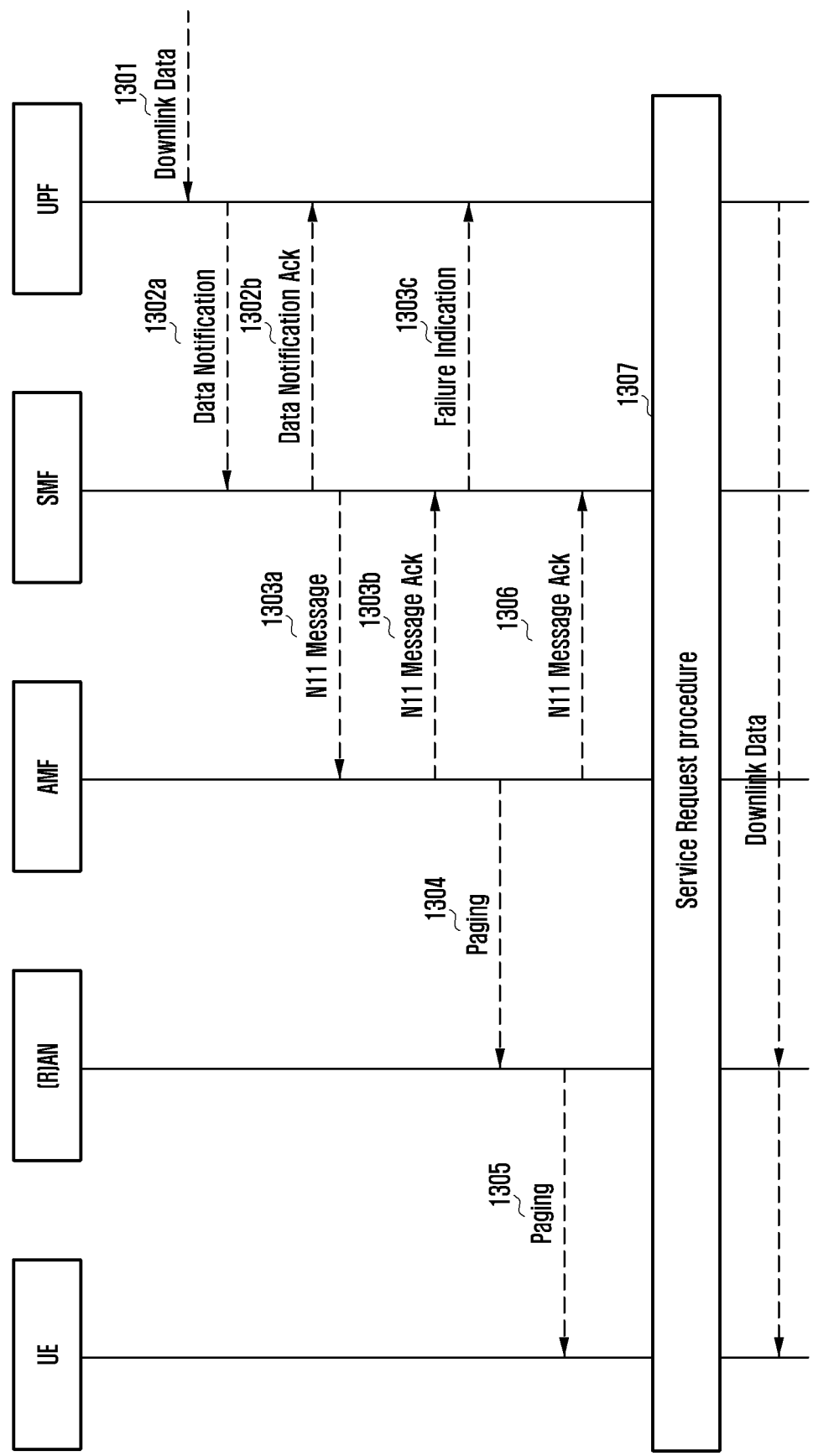
FIG. 13 is a diagram of an network (NW) triggered service request procedure in the 5G cellular network, according to an embodiment.

In FIGS. 12A, 12B, and 13, a service request procedure including a process of adding the additional anchor UPF for local offloading to the PDU Session or releasing the additional anchor UPF, which has been conventionally added, when the UE in a CM-CONNECTED state performs the service request for the inactive PDU session having no UP connection is described.

Referring to FIGS. 12A and 12B, when the UE is required to configure a UP path of a specific PDU session due to the generation of uplink data traffic, the UE transmits a service request message together with identification information of the corresponding PDU session (e.g., a PDU session ID) through NAS signaling at step 1201. The NAS signaling is transmitted to the AMF via the RAN, and the RAN may transmit location information and identification information thereof (including a cell ID, a RAN ID, identification information in the unit of tracking areas to which the BS belongs, and an access type) together with the NAS signaling through an N2 message at step 1202.

Then, the AMF transmits an N11 message for activating a UP transmission path of the PDU session to the SMF that manages the corresponding PDU session based on PDU session identification information included in the service request message at step 1203. Here, activating refers setting up again the UP transmission path, which has been released (i.e., allocating resources for the tunnel setup and exchanging information). Further, when network entities of the 5G network provide a service interface as illustrated in FIGS. 12A and 12B, the N11 message may be replaced with an operation of a service provided by the AMF or the SMF.

The SMF having received the N11 message may determine whether the UE enters a service area of the additional anchor UPF for local offloading or leaves the service area of the additional anchor UPF for the corresponding PDU Session based on identification and location information of the RAN which the UE currently accesses. When it is determined that the location of the UE accessing the BS pertains to the service area of the additional anchor UPF, the additional anchor UPF may be added. On the other hand, when it is determined that the location of the UE accessing the BS leaves the service area of the additional anchor UPF, the additional anchor UPF may be released.

In order to release the additional anchor UPF, the SMF may transmit an N4 session establishment request to the corresponding UPF at step 1204a. The N4 session establishment request may include PDU session identification information of the UE (e.g., the N4 session ID) and information on N4 session context to be installed in the UPF. The N4 session context information may include a packet detection rule including information on a rule for identifying a packet, which arrives at the UPF, a forwarding action rule including a rule about packet processing (forwarding/drop/buffering), a usage reporting rule for collecting information on packet charging and usage, and a QoS enforcement rule including information on QoS requirements of the corresponding PDU session (e.g., maximum rate enforcement). Further, when the SMF allocates a new IP address/prefix, such information may be included together. When the UPF having received the N4 session establishment request message sets up a tunnel for the corresponding PDU session and completes the setup of the association with the IP address/prefix, the UPF may transmit an N4 session establishment response to return the generated tunnel identification information (e.g., a TEID) to the SMF at step 1204b. Identification information (e.g., the N4 session ID) generated to identify the corresponding PDU session may be transmitted.

In order to release the additional anchor UPF, the SMF may transmit an N4 session release request to the corresponding UPF at step 1204a. The N4 session release request may include information for identifying the PDU session of the UE (e.g., an N4 session ID) and a release cause value. The release cause may indicate that the UE leaves the service area of the corresponding UPF. Further, information for releasing the IP address/prefix associated with the corresponding UPF may be also included. The UPF having received the N4 session release request may discard remaining packets of the corresponding PDU session and delete PDU session context including all pieces of tunnel information related to the corresponding PDU session and the IP address/prefix. A packet detection rule, a forwarding action rule, a usage reporting rule, and a QoS enforcement rule related to the PDU session may be also deleted. When the UPF successfully completes the release of the PDU session context, the UPF may generate an N4 session release response to transmit it to the SMF at step 1204b. The N4 session release response may include information for identifying the PDU session of the UE such as the N4 session ID.

Particularly, when the additional anchor UPF is added to the IPv6 multi-homed PDU session, the SMF may transmit the IPv6 prefix associated with the additional anchor UPF to the UE in addition to the PDU session at step 1204c. The SMF generates a RA message in order to transmit the IPv6 prefix, and the UE may also transmit routing information (e.g., a destination address) for properly selecting the IPv6 allocated to the existing PDU session and the newly allocated IPv6 prefix. The RA message may include domain information (e.g., FQDN) of content which a local server for local offloading can download or an (e.g., 5-tuple-based) IP address range corresponding thereto. The routing information may be provided in advance to the SMF or may be dynamically provided from a PCF that provides a policy for the session. The IPv6 RA message may be transmitted from the SMF to the UE via the additional anchor UPF.

Meanwhile, when the additional anchor UPF is released, the SMF may additionally generate a message for establishing the IPv6 prefix in order to invalidate the IPv6 prefix associated with the additional anchor UPF. In order to configure a lifetime of the IPv6 prefix to be invalidated as zero and transmit an IPv6 RA message to the UE, the configuration of the IPv6 prefix may be first transmitted to the remaining anchor UPF (Orig. PSA of FIGS. 12A and 12B) at step 1204*c*. Additionally, when the configuration of invalidating the IPv6 prefix is not transmitted to the UE, the SMF may generate the RA message for re-configuring the IPv6 prefix associated with the remaining anchor UPF (Orig. PSA of FIGS. 12A and 12B) in the PDU session and transmit the generated RA message to the UE. The IPv6 RA message may include routing information for the IPv6 prefix that can be still used and a routing rule for preferentially using the IPv6 prefix. A default route path may be configured or a priority higher than that of the IPv6 prefix determined to be invalidated may be configured.

When the additional anchor UPF is added, the PIv6 RA message may be generated by the SMF and transmitted to the UE via the additional anchor UPF. However, when the additional anchor UPF is released, the PIv6 RA message may be generated by the SMF and transmitted to the UE via the additional anchor UPF or the existing original anchor UPF. When the data transmission path of the PDU session is not set up, the IPv6 RA message may be buffered in the anchor UPF or may be forwarded to the intermediate UPF which performs buffering. Then, the IPv6 RA message may arrive at the UE from the UPF buffering the IPv6 RA message through the data transmission path of the corresponding PUD session at a time point at which DL data can be transmitted to the UE. The IPv6 RA message may be first transmitted to the UE before the N4 session release procedure with the additional anchor UPF. As described above, when the data transmission path of the PDU session is not set up, the IPv6 RA message has been transmitted in advance to the additional anchor UPF and buffered.

When the SMF manages the PDU session in which a plurality of anchor UPFs including the new additional anchor UPF exist, the SMF may additionally select an intermediate UPF (e.g., a new I-UPF of FIGS. 12A and 12B) that provides a BP/UL CL function for dividing or adding traffic between the BS which the UE accesses and the anchor UPF at step 1205. Thereafter, since the operation related to the addition of the new intermediate UPF is similar to the process at steps 706*a* and 706*b*, a detailed description thereof will be omitted. In addition, when the additional anchor UPF added to the PDU session can directly provide the BP or UL CL function, the process of selecting the new intermediate UPF may be omitted.

Meanwhile, when the additional anchor UPF is released, when the SMF determines that there is connectivity between the BS and the remaining anchor UPF (Orig. PSA of FIGS. 12A and 12B) and there is the intermediate UPF (old I-UPF of FIGS. 12A and 12B) conventionally set up for the PDU session, the SMF may configure a timer for performing a procedure of releasing it. Further, when the SMF knows that DL data arrives at the corresponding PDU session including the IPv6 RA message (e.g., when the SMF receives a data notification from the UPF), the SMF may perform the N4 session modification procedure with the remaining anchor UPF. Through the N4 session modification procedure, a tunnel through which the existing intermediate UPF (old I-UPF of FIGS. 12A and 12B) forwards buffered data to the anchor UPF (Orig. PSA of FIGS. 11A and 11B) may be set up. Thereafter, the SMF may provide tunnel information for forwarding buffered data by performing the N4 session modification procedure with the existing intermediate UPF. The existing intermediate UPF may directly transmit the buffered data through the data forwarding tunnel set up by the anchor UPF. The SMF may additionally configure a timer for releasing the data forwarding tunnel.

Meanwhile, when the SMF determines that there is no connectivity between the BS and the remaining anchor UPF (Orig. PSA of FIGS. 12A and 12B) for the PDU session (e.g., when a direct N3 tunnel cannot be established), the SMF may newly select the intermediate UPF for making the connectivity between the BS and the anchor UPF at step 1205. When the intermediate UPF (old I-UPF of FIGS. 11A and 11B) is already included in the PDU session, the new intermediate UPF (new I-UPF of FIGS. 12A and 12B) may be selected only when there is no connectivity between the BS and the intermediate UPF.

The new intermediate UPF may be selected from UPFs having connectivity with both the BS and the anchor UPF, and the selection of the UPF may be performed based on various parameters which the SMF can consider such as UE location information, a UPF load state, UPF location information, and UPF capacity. When the SMF selects the intermediate UPF, the SMF may perform the N4 session setup procedure with the intermediate UPF at steps 1206*a* and 1206*b* and perform the N4 session modification procedure with the anchor UPF at steps 1207*a* and 1207*b* in order to update a UP transmission path for the PDU session. When there are a plurality of anchor UPFs including the additional anchor UPF in the PDU session, the SMF may perform the N4 session modification procedure with all of them. The N4 session setup procedure may include a step in which the SMF transmits N4 session establishment request signaling including an identification address of the anchor UPF and tunnel identification information required for the N9 tunnel setup to the intermediate UPF, as well as a step in which the intermediate UPF transmits N4 session establishment response signaling including an identification address of the intermediate UPF and tunnel identification information required by the intermediate UPF for the N9 tunnel setup with the anchor UPF to the SMF. Further, when DL data is generated, the SMF may additionally make a request for the tunnel setup for forwarding buffered data. Thereafter, through the N4 session modification procedure, the SMF may provide information (e.g., the identification information of the intermediate UPF and the tunnel identification information) for the N9 tunnel setup with the intermediate UPF and information on the buffered data forwarding tunnel to the anchor UPF. The anchor UPF having received the information on the data forwarding tunnel may directly forward the buffered data to the intermediate UPF at step 1209.

When the intermediate UPF is already included in the PDU session, the SMF may perform an operation related to the N4 session modification with the existing intermediate UPF instead of the anchor UPF (i.e., steps 1207*a* and 1207*b* instead of steps 1208*a* and 1208*b*).

Next, the SMF may transmit an N11 message including the PDU session identification information and CN tunnel information for the N3 tunnel setup between the intermediate UPF and the BS to the AMF at step 1210. Further, when network entities of the 5G network provide a service interface as illustrated in FIGS. 12A and 12B, the N11 message may be replaced with an operation of a service provided by the AMF or the SMF.

Thereafter, the AMF transmits an N2 request message including the CN tunnel information and the PDU session identification information received from the N11 message to the BS at step 1211. The AMF may also transmit an NAS message corresponding to service accept. The BS having received the messages allocates resources for the N3 tunnel setup for the corresponding session and transmit the NAS message to the UE. At this time, the BS and the UE may perform an RRC connection reconfiguration to set up a DRB that complies with the QoS rule of the corresponding session at step 1212. When the DRB setup is completed, the UE may transmit uplink data to the BS. The BS may transmit an N2 request ACK message including RAN tunnel identification information allocated for the N3 tunnel to the AMF at step 1213.

Thereafter, the AMF may transmit an SM request message including the RAN tunnel information for the N3 tunnel setup included in the N2 request ACK message to the corresponding SMF at step 1214. Further, when network entities of the 5G network provide a service interface as illustrated in FIGS. 12A and 12B, the SM request message may be replaced with an operation of a service provided by the SMF.

Thereafter, the SMF may perform a signaling exchange with the PCF to apply a dynamic policy for the PDU session and register a UE location as necessary at step 1215. Next, the SMF may perform an N4 session modification procedure to transmit the RAN tunnel information to the intermediate UPF at steps 1216*a* and 1216*b*. When there is no change in the intermediate UPF, the procedure may be performed with the old I-UPF. Transmission of the buffered DL data including the IPv6 RA message may be started.

Thereafter, the SMF may transmit ACK of the SM request message at step 1214 to the AMF at step 1217. Further, when network entities of the 5G network provide a service interface as illustrated in FIGS. 12A and 12B, the response to the SM request message may be also replaced with an operation of a service provided by the SMF.

When the data forwarding tunnel is set up by the SMF, the N4 session modification procedure for releasing the forwarding tunnel may be performed at a time point of expiration of a timer set up when the tunnel is set up at steps 1218*a* and 1218*b*.

When there is a change in the intermediate UPF from the old I-UPF to the new I-UPF by the SMF, the SMF may perform an N4 session release procedure with the old I-UPF in order to release PDU session context of the old I-UPF if a time configured to release the old UPF expires at a time point at which the new I-UPF is set up at steps 1219*a* and 1219*b*.

Similarly, the name of the signaling message used can be changed, and the order of some signaling may be changed or signaling may be integrated according to requirements such as service request procedure performance optimization.

FIG. 13 is a diagram of an NW triggered service request procedure in the 5G cellular network, according to an embodiment.

It is possible to add or release the additional anchor UPF for local offloading to or from the already set up PDU Session based on a NW triggered service request procedure. As illustrated in FIG. 13, when downlink data traffic arrives from a DN (e.g., Internet or a local server), the UE in a CM-IDLE state may transit to a CM-CONNECTED state or a procedure required for transmitting DL traffic may be performed in a state in which the UE is in the CM-CONNECTED state but the UP connection of the PDU session to which the DL traffic belongs is deactivated.

Specifically, the UPF may receive DL traffic at step 1301 and transmit DL data notification signaling indicating that DL data arrives at the SMF that manages the corresponding PDU session at step 1302*a*. For management of a plurality of PDU sessions for the same UE, the SMF may also include an ID of the PDU session. The UPF may receive ACK of the DL data notification signaling from the SMF at step 1302*b*. The DL data notification message may be forwarded from the SMF to the AMF that manages mobility of the UE through the N11 message at step 1303*a*. The SMF may receive ACK of the N11 message from the AMF at step 1303*b* or 1306. Thereafter, the AMF may store SMF that transmits the DL data notification and PDU session identification information. When the SMF receives information indicating that the UE is unreachable or that the UE is reachable only for regulatory prioritized service from the AMF, the SMF may transmit a failure indication to the UPF at step 1303*c*.

The AMF may perform paging for the UE in the CM-IDLE state at steps 1304 and 1305 and thus the UE may perform the service request described in the sixth embodiment in response to the paging at step 1307. The SMF having recognized the location of the UE may determine whether the UE enters a service area of the additional anchor UPF for local offloading or leaves the service area of the additional anchor UPF for the PDU session. When it is determined that the location of the UE pertains to the service area of the additional anchor UPF, the additional anchor UPF may be added. On the other hand, when it is determined that the location of the UE leaves the service area of the additional anchor UPF, traffic received from the additional anchor UPF may be dropped and a procedure for releasing the additional anchor UPF may be performed.

When the UE is in the CM-CONNECTED state, the AMF may transmit location information of the UE to the SMF without paging. The SMF having recognized the location of the UE may determine whether the UE enters a service area of the additional anchor UPF for local offloading or leaves the service area of the additional anchor UPF for the PDU session. When it is determined that the location of the UE pertains to the service area of the additional anchor UPF, the additional anchor UPF may be added. On the other hand, when it is determined that the location of the UE leaves the service area of the additional anchor UPF, traffic received from the additional anchor UPF may be dropped and a procedure for releasing the corresponding UPF may be performed.

The procedure in which the SMF adds or releases the additional anchor UPF to or from the PDU session which the UE sets up may be performed based on the process according to the sixth embodiment of the seventh embodiment.

Figure 14A:
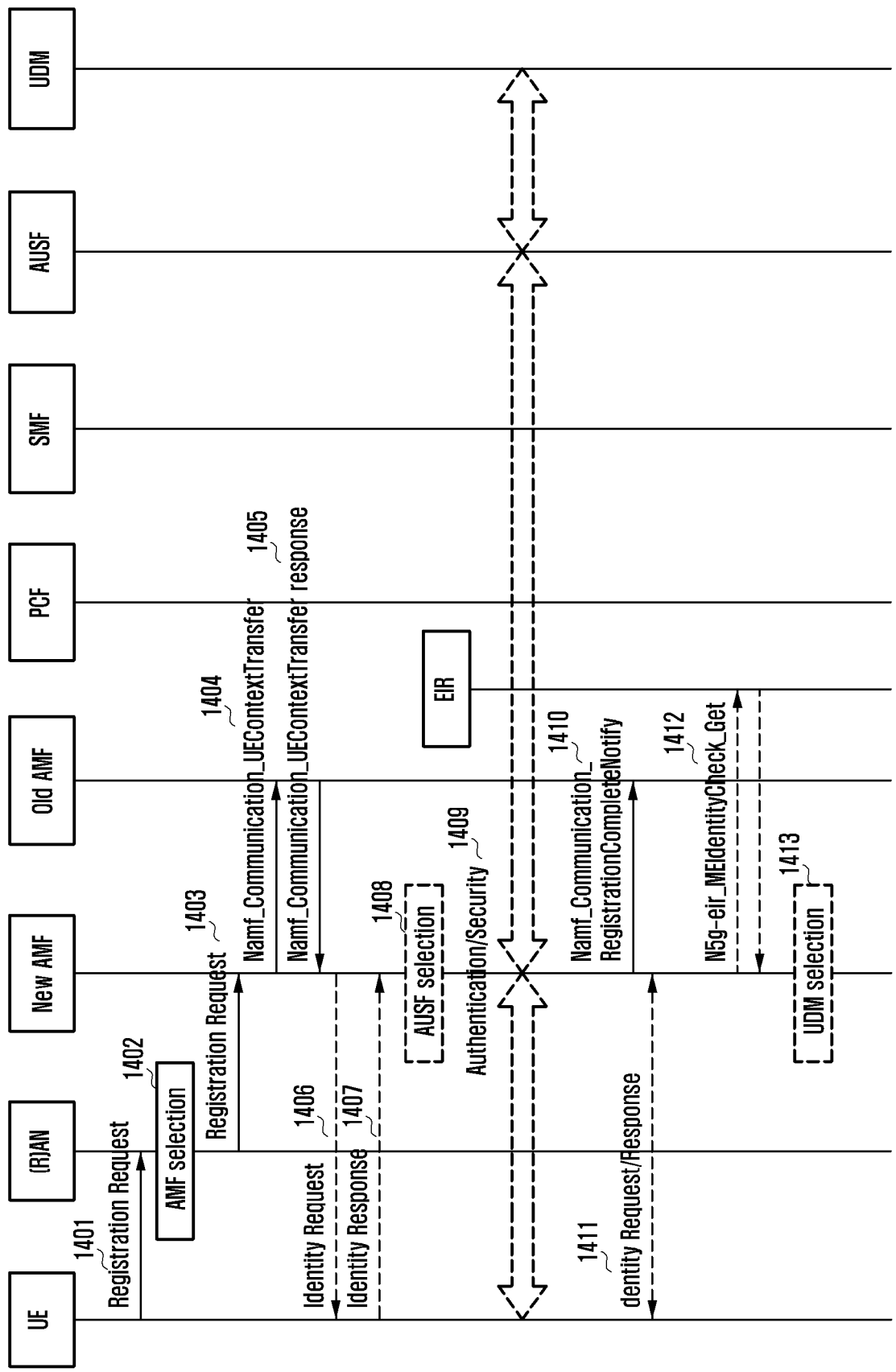
FIGS. 14A and 14B are diagrams of a registration procedure in the 5G cellular network, according to an embodiment.
Figure 14B:
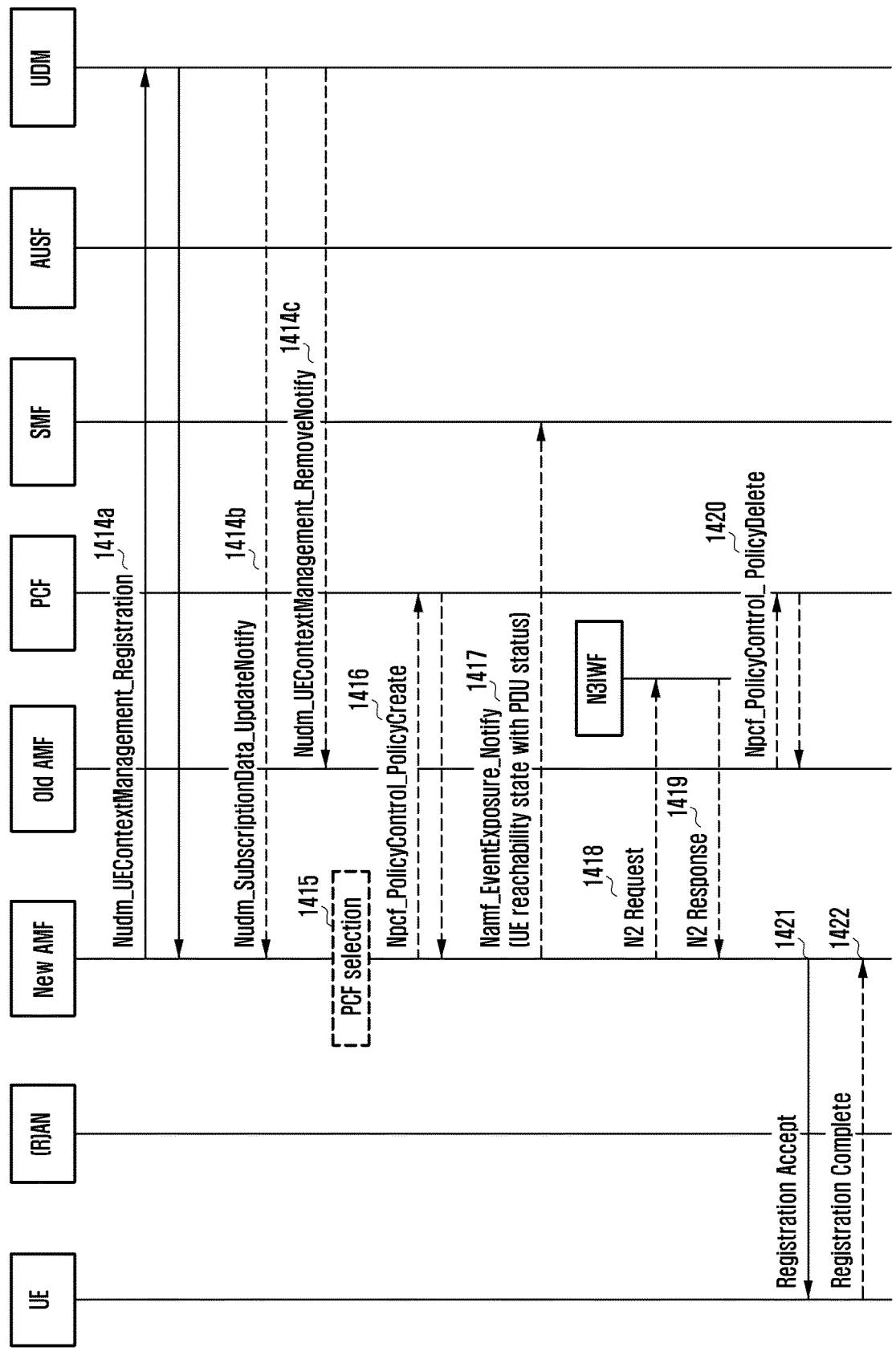

FIGS. 14A and 14B are diagrams of a registration procedure in the 5G cellular network, according to an embodiment.

In FIGS. 14A and 14B, a registration procedure in the 5G cellular network is described. The UE may perform a registration process with the 5G network to acquire a right to use a service provided by the 5G cellular network, detect the location of the UE in the 5G network, or provide a service. The registration may be performed through the registration procedure illustrated in FIGS. 14A and 14B, wherein an initial registration may be performed when a registration is initially performed in the 5G network, a mobility registration may be performed when the UE in the CM-IDLE state leaves an allocated registration area (e.g., a list of areas in the unit of TAs), and a periodic registration may be performed when a periodic registration timer expires. In order to perform registration in the network, the UE transmits a registration request message to the network at step 1401 and the (R)AN selects a new AMF at step 1402 and transmits the registration request message to the AMF at step 1403. The new AMF may receive information on the UE from the old AMF which has been in charge of the UE at steps 1404 to 1405. When the new AMF does not receive a UE ID such as a subscriber permanent identifier (SUPI) from the old AMF, the new AMF may make a request for the UE ID to the UE and receive it from the UE at steps 1406 to 1407. The new AMF selects an authentication server function (AUSF) in order to authenticate the UE and generate a security key and perform an authentication/security procedure at steps 1408 to 1410. The new AMP may check a permanent equipment identity (PEI) of the UE through an equipment identifier repository (EIR) at steps 1411 to 1412. The new AMF selects a user data management (UDM) in order to load subscription information of the UE and loads the UE subscription information from the UDM at steps 1413 to 1414*c*. Further, the new AMF selects a PCF in order to load network policy information of the UE and loads the network policy information of the UE at steps 1415 to 1417. When the AMF is changed and the old AMF has UE association with a non 3GPP inter-working function (N3IWF), the new AMF informs the N3IWF of the change in the AMF and release NG application protocol (NGAP) UE association with the old AMF at steps 1418 to 1419. Association between the old AMF and the PCF is deleted at step 1420. When all the procedures are successfully performed, the UE transmits a registration accept message in order to inform of success of the registration at steps 1421 to 1422.

Some of the procedures illustrated in FIGS. 14A and 14B may be omitted when the mobility registration or the periodic registration is performed. Through the registration process, the UE may update its own capability information in the 5G network and negotiate various parameters with the 5G network.

Figure 15:
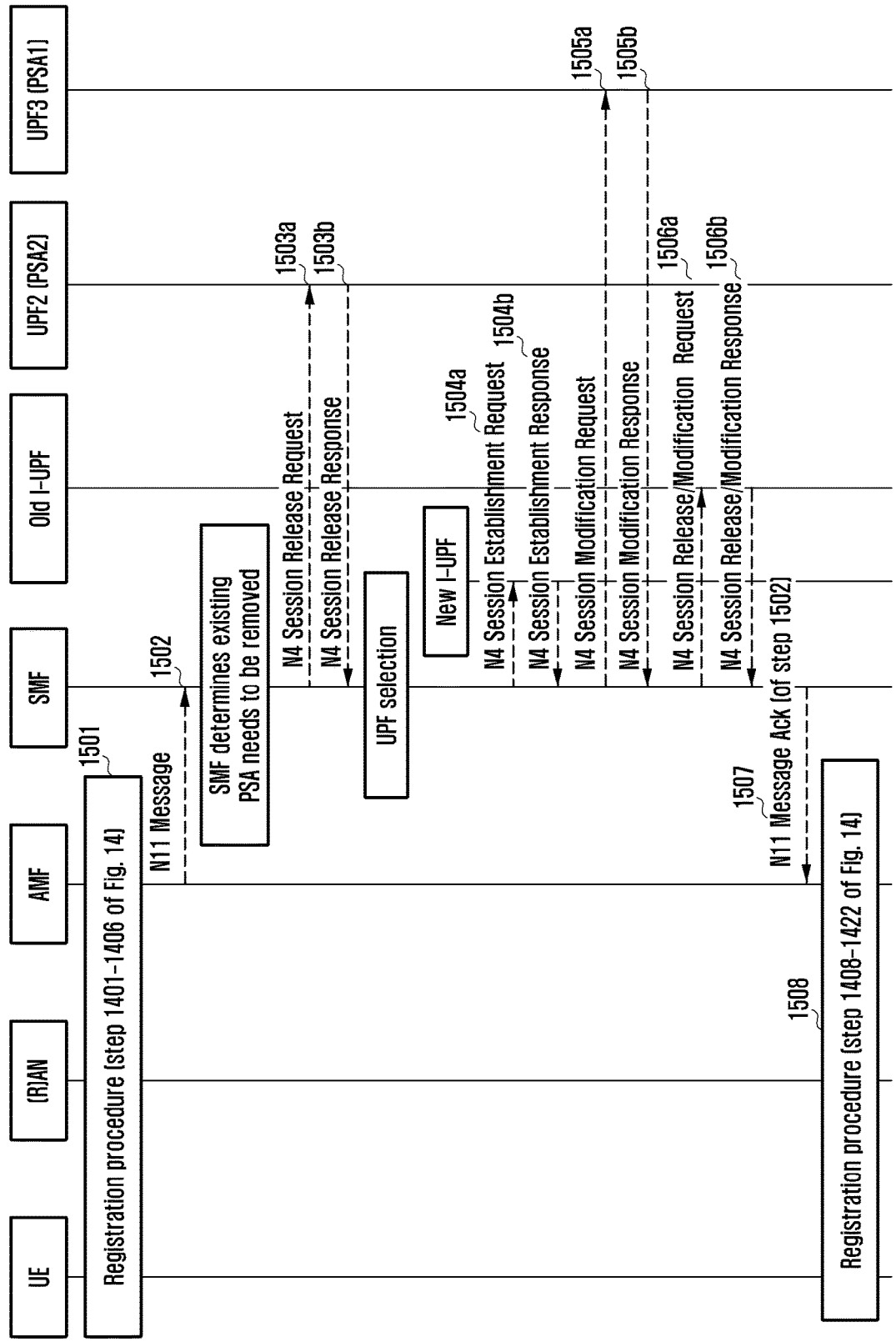
FIG. 15 is a diagram of a registration procedure, according to an embodiment.

FIG. 15 is a diagram of a registration procedure including a process of releasing the conventionally added additional anchor UPF from the already set up PDU session when the UE in the CM-IDLE state performs the registration procedure, according to an embodiment.

In FIG. 15, a registration procedure including a process of releasing the additional anchor UPF which has been conventionally added to the PDU session that has been already set up when the UE in the CM-IDLE state performs the registration procedure is described. As illustrated in FIG. 15, a procedure may be additionally performed during the process (step 1501) of performing the registration procedure as shown in FIGS. 12A, 12B and 13.

First, the AMF may provide a service of notifying of a location change of the UE. The SMF that manages the PDU session of the UE may newly subscribe to the notification service when the additional anchor UPF is added to the PDU session or, when the SMF has already subscribed and the location of the UE is changed based on a service area of the additional anchor UPF, may update subscription information to receive a notification. When the location of the UE leaves the service area of the additional anchor UPF, the AMF may notify the SMF of an event together with new location information of the UE.

The AMF may transmit the notification of the location change of the UE to the SMF through an N11 message at step 1502. Further, when network entities of the 5G network provide a service interface as illustrated in FIGS. 14A and 14B, the N11 message may be also replaced with an operation of a service provided by the AMF (e.g., step 1417 of FIG. 14B).

The SMF having received the N11 message may determine whether the UE leaves the service area of the additional anchor UPF (e.g., PSA2 of FIG. 15) of the corresponding PDU Session based on identification information and location information of the RAN which the UE currently accesses. When it is determined that the location of the UE accessing the BS leaves the service area of the additional anchor UPF, the additional anchor UPF may be released.

In order to release the additional anchor UPF, the SMF may transmit an N4 session release request to the corresponding UPF at step 1503*a*. The N4 session release request may include information for identifying the PDU session of the UE (e.g., an N4 session ID) and a release cause value. The release cause may indicate that the UE leaves the service area of the corresponding UPF. Further, information for releasing the IP address/prefix associated with the corresponding UPF may be also included. The UPF having received the N4 session release request may discard remaining packets of the corresponding PDU session and delete PDU session context including all pieces of tunnel information related to the corresponding PDU session and the IP address/prefix. When the UPF successfully completes the release of the PDU session context, the UPF may generate an N4 session release response to transmit it to the SMF at step 1503*b*. The N4 session release response may include information for identifying the PDU session of the UE such as the N4 session ID.

Thereafter, an intermediate UPF (e.g., new I-UPF of FIG. 15) for making connectivity between the target BS and the original anchor UPF (e.g., PSA1 of FIG. 15) may be selected. The intermediate UPF may be selected from UPFs having connectivity with both the target BS and the anchor UPF (e.g., PSA1 of FIG. 15), and the selection of the UPF may be performed based on various parameters which the SMF can consider such as UE location information, a UPF load state, UPF location information, and UPF capacity.

When the SMF selects the intermediate UPF, the SMF may perform the N4 session setup procedure with the intermediate UPF at steps 1504*a* and 1504*b* and perform the N4 session modification procedure with the anchor UPF at steps 1505*a* and 1505*b* in order to update a UP transmission path for the PDU session. The N4 session setup procedure may include a step in which the SMF transmits N4 session establishment request signaling including an identification address of the anchor UPF and tunnel identification information required for the N9 tunnel setup to the intermediate UPF, as well as a step in which the intermediate UPF transmits N4 session establishment response signaling including an identification address of the intermediate UPF and tunnel identification information required by the intermediate UPF for the N9 tunnel setup with the anchor UPF to the SMF. Thereafter, through the N4 session modification procedure, the SMF may provide information (e.g., the identification information of the intermediate UPF and the tunnel identification information) for the N9 tunnel setup with the intermediate UPF to the anchor UPF at steps 1505*a* and 1505*b*.

When the intermediate UPF (e.g., old I-UPF of FIG. 15) is already included in the PDU Session, if the old I-UPF is changed to a new I-UPF, the SMF may perform the N4 session release procedure with the old I-UPF at steps 1506*a* and 1506*b*. If the intermediate UPF included in the PDU session is not changed, the SMF may perform the N4 session modification procedure with the intermediate UPF at steps 1506*a* and 1506*b*. The SMF may remove a (e.g., 5-tuple-based) routing filter rule for the BP/UL CL function configured in the intermediate UPF.

Thereafter, at step 1507, the SMF may respond to the N11 message transmitted at step 1502. When network entities of the 5G network provide a service interface, the N11 message transmitted by the SMF may be replaced with the operation of the service provided by the SMF.

The N11 message may include not only identification information of the corresponding PDU session but also information for invalidating the IPv6 prefix associated with the additional anchor UPF in the case of an IPv6 multi-homed PDU session. Information on the IPv6 prefix may be included in the registration accept message which the AMF transmits to the UE.

Thereafter, the AMF may perform the remaining procedures required for completing the registration at step 1508, which may correspond to, for example, steps 1418 to 1422 of FIG. 14B.

When the SMF releases the additional anchor UPF with which the IPv6 prefix is associated and then does not include information thereon in the N11 message, which is transmitted to the AMF, the release may not be notified of to the UE and, thereafter, the following operation may be performed.

After the additional anchor UPF is released, the UE may transmit uplink data using the invalid IPv6 prefix. The data arrive at the remaining (original) anchor UPF in the corresponding PDU session. The anchor UPF may determine that a source IP address of corresponding data is not valid and thus may generate an ICMPv6 error message of configuring code no. 5 (source address failed ingress/egress policy) of the message "destination unreachable" and transmit it to the UE. The UE having received the error message may recognize that the IP prefix cannot be used and transmit data using another IP prefix. When there are a plurality of IP prefixes, an IP prefix that matches a destination address may be selected based on an IP routing table.

Additionally, for the RA message including invalidation information of the IP prefix, which the SMR transmits to the UE, the NW triggered service request described in FIG. 13 may be performed. The SMF may transmit a data notification to the AMF together with identification information of the PDU session. When the UP connection for the PDU session is completed (i.e. activation), the SMF may transmit the IPv6 RA message to the UE via the remaining anchor UPF through the data transmission path.

Further, the IPv6 prefix corresponds to the PDU Session in the IPv6 type but, when the procedure is applied to the cellular system in which IPv4 multi-homing is supported, the IPv6 prefix may be replaced with an IPv4 address if the PDU session in the IPv4 type is used.

Figure 16:
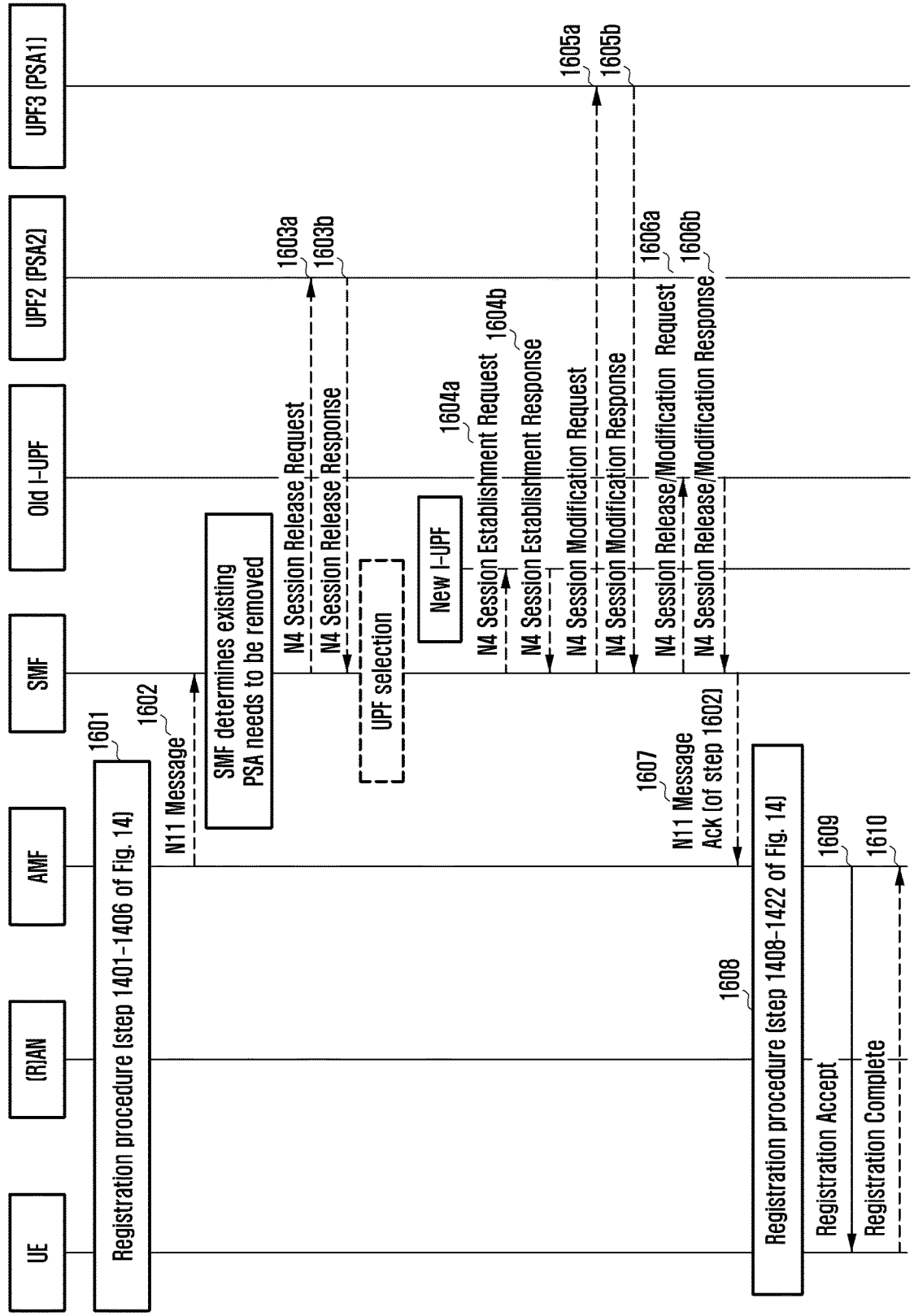
FIG. 16 is a diagram of a registration, according to an embodiment.

FIG. 16 is a diagram of a registration procedure including a process of releasing the conventionally added additional anchor UPF from the already set up PDU session and a process of transmitting a notification to the UE when the UE in the CM-IDLE state performs the registration procedure, according to an embodiment.

In FIG. 16, a method by which the SMF notifies the UE of an associated IP prefix through signaling connection when the SMF that manages a specific PDU session removes the additional anchor UPF with which the IP prefix is associated in the PDU session is described. FIG. 16 includes a procedure in which the SMF releases the additional anchor UPF when the registration procedure is performed (steps 1601 to 1608 may correspond to steps 1501 to 1508 of FIG. 15). The SMF may transmit such a fact to the AMF through the N11 message and the AMF may notify the UE of information received from the SMF through the N11 message at step 1609. Further, the AMF may receive a registration complete message from the UE at step 1610. Specifically, the N11 message may include N1 SM information to be transmitted to the UE.

The N1 SM information may be defined by the following message. First, information indicating to no longer use the IP prefix associated with the released additional anchor UPF may be included.

Second, information indicating that the anchor UPF corresponding to the released additional anchor UPF is released may be included. The UE should manage mapping information of the anchor UPF newly allocated whenever the PDU session is set up and the anchor UPF is added. When receiving information indicating that a specific anchor UPF is released from the SMF, the UE may release the corresponding anchor UPF and operate to not use the IP prefix associated therewith any more.

The two methods may be embodied through a method such as inter-process communication (IPC) between a control plane layer implemented in the modem of the UE and an IP routing layer implemented in the OS of the UE.

Third, information making a request for activating the PDU session to which the released additional anchor UPF belongs may be included. When receiving the N1 SM information, the UE may perform a procedure of setting up the UP connection of the corresponding PDU session by directly performing the service request. When the data transmission path of the PDU session is completely configured, the SMF may transmit information on invalidation of the IPv6 prefix associated with the released anchor UPF to the UE through the IPv6 RA message.

In order to invalidate the IPv6 prefix, the SMF may configure the IPv6 prefix to be invalidated and a router lifetime field as zero in the IPv6 RA message and transmit the IPv6 RA message. When receiving the IPv6 RA message, the UE may configure an invalidation timer value with reference to the router lifetime field. If the router lifetime field is configured as zero, the UE may change the corresponding IP prefix to an invalid immediately upon receiving the RA message state and may not use it.

In order to invalidate the IPv6 prefix, the SMF may configure the IPv6 prefix to be invalidated and a valid lifetime value of a prefix information option as zero in the IPv6 RA message and transmit the IPv6 RA message. When receiving the IPv6 RA message, the UE may configure an invalidation timer value with reference to the valid lifetime value in the prefix information option. If the valid lifetime value is configured as zero, the UE may change the corresponding IP prefix to an invalid state immediately upon receiving the RA message and may not use it.

In order to invalidate the IPv6 prefix, the SMF may configure a valid IPv6 prefix (i.e., the IP prefix associated with the remaining anchor UPF in the corresponding PDU session) as a default router and configure preference as high in the IPv6 RA message, and transmit the IPv6 RA message. Since the UE can preferentially use the valid IPv6 prefix upon receiving the IPv6 RA message, the UE may not use the invalid IPv6 prefix.

In order to invalidate the IPv6 prefix, the SMF may use the following method. When the additional anchor UPF for local offloading is additionally allocated to a specific PDU session, the SMF may generate an IPV6 RA message to allocate the IPv6 prefix associated with the additional anchor UPF to the UE. In the IPv6 RA message, a finite value larger than 0 may be configured in the router lifetime field together with the newly allocated IPv6 prefix. The UE having received the IPv6 prefix may use the IPv6 prefix only for a specific time with reference to the router lifetime field. In order to continuously use the IPv6 prefix over a time configured in the router lifetime field, the SMF should transmit the IPv6 RA message for extending the lifetime to the UE. Accordingly, by not transmitting the IPv6 RA message for extending the lifetime after the additional anchor UPF is released, the SMF may prevent the UE from using the corresponding IPv6 prefix after the lifetime expires.

Further, the IPv6 prefix corresponds to the PDU session in the IPv6 type but, when the procedure is applied to the cellular system in which IPv4 multi-homing is supported, the IPv6 prefix may be replaced with an IPv4 address if the PDU session in the IPv4 type is used.

Figure 17:
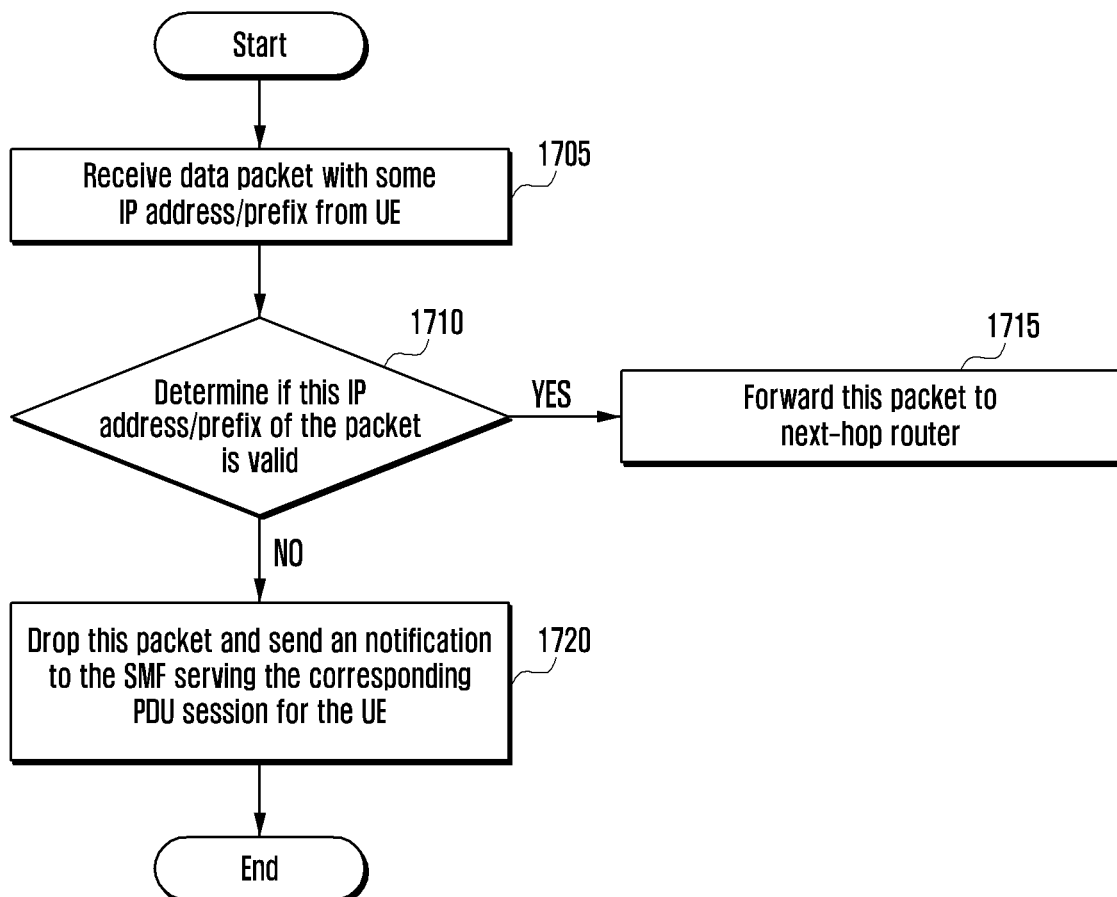
FIG. 17 is a diagram of an operation of the UPF when a data packet having an invalidated IPv6 prefix configured as a departure IP address arrives at the UPF from which an IP header can be identified, according to an embodiment.

FIG. 17 is a diagram of an operation of the UPF when a data packet having an invalidated IPv6 prefix configured as a departure IP address arrives at the UPF from which an IP header can be identified, according to an embodiment.

In FIG. 17, a scheme in which the UE receives the IPv6 prefix associated with the additional anchor UPF in a specific PDU Session but processes generated data in the cellular network through the (invalidated) IPv6 prefix after the additional anchor UPF is released by the SMF is described. The UPF may be an IP anchor UPF or a UPF having the BP or UL CL function that performs a traffic routing function.

The UPF may receive data having a predetermined IPv6 prefix configured as a departure IP address at step 1705. The UPF may determine whether the data packet uses a valid IP address at step 1710. When the UPF uses the valid IP address, the UPF may forward the data packet to a next-stage UPF or a router of the Internet network located outside the cellular network in order to transmit the data packet to a destination specified in a destination IP address at step 1715. When the UPF uses an invalid IP address, the UPF may drop the data packet and transmit a notification including the invalid IP address and corresponding PDU session identification information to the SMF that manages the corresponding PDU session at step 1720.

Figure 18:
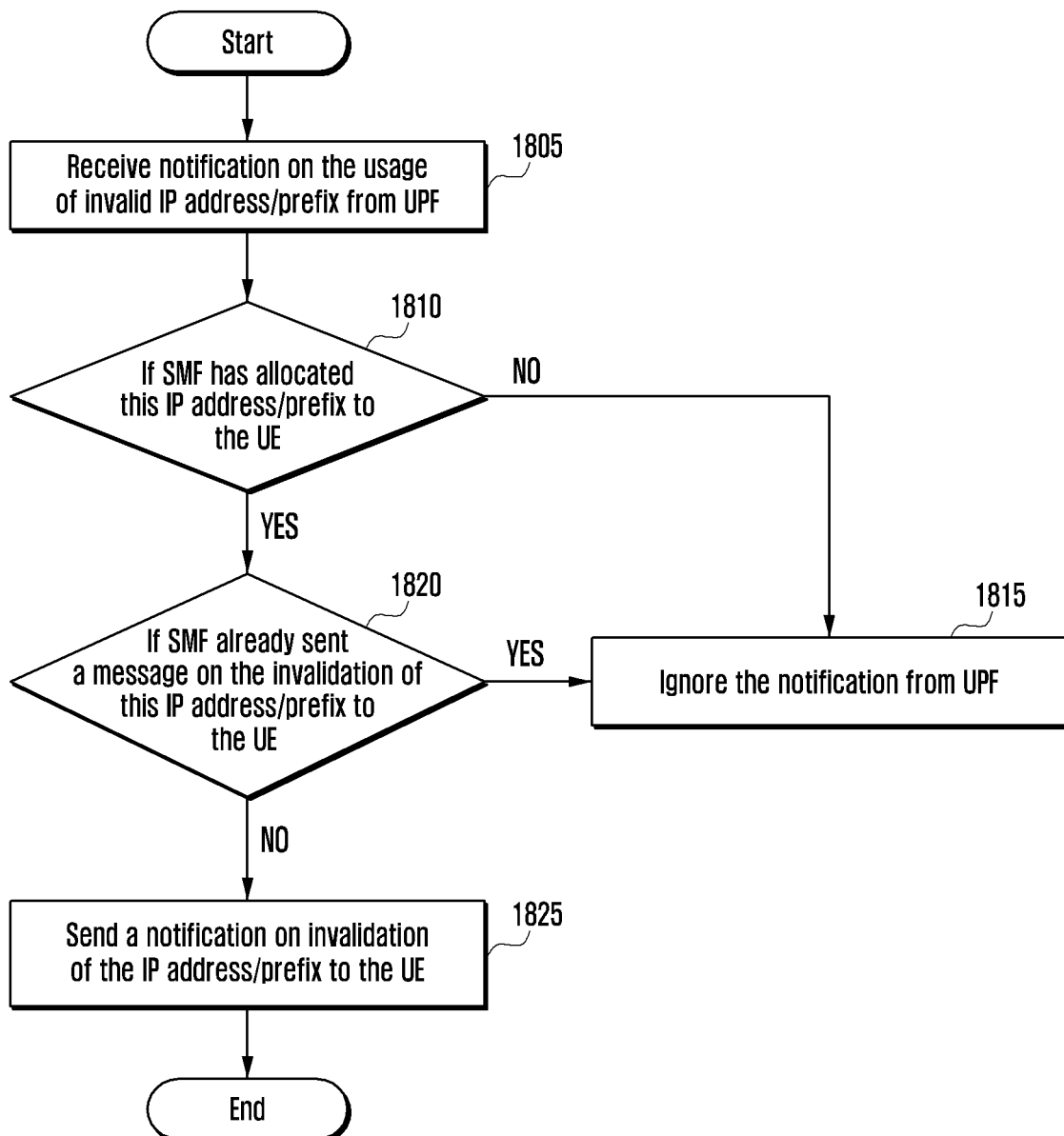
FIG. 18 is a flowchart of an operation of the SMF receiving a notification message for the use of the invalid IP address from the UPF, according to an embodiment.

FIG. 18 is a diagram of an operation of the SMF receiving a notification message for the use of the invalid IP address from the UPF, according to an embodiment.

The SMF receives a notification message for the use of the invalid IP address from the UPF at step 1805. When receiving the notification, the SMF may determine whether the corresponding IP prefix is an IP prefix which the SMF has conventionally allocated for the corresponding PDU session of the UE at step 1810. When the IP prefix is not the IP prefix which has been conventionally allocated, the SMF may ignore the notification message at step 1815. However, when it is determined that the IP prefix has been conventionally allocated, the following step may be additionally performed. At step 1820, it is determined whether the SMF releases the additional anchor UPF associated with IP prefix and the notification thereon has been already transmitted to the UE. When the notification has been already transmitted to the UE, the corresponding message may be ignored like at step 1815. However, when the additional anchor UPF has been released but the notification thereon has not been transmitted to the UE yet, the SMF may generate a notification message for invalidating the corresponding IP prefix and transmit it through the IPv6 RA message to the UE at step 1825.

Further, the IPv6 prefix corresponds to the PDU session in the IPv6 type but, when the procedure is applied to the cellular system in which IPv4 multi-homing is supported, the IPv6 prefix may be replaced with an IPv4 address if the PDU session in the IPv4 type is used.

Figure 19:
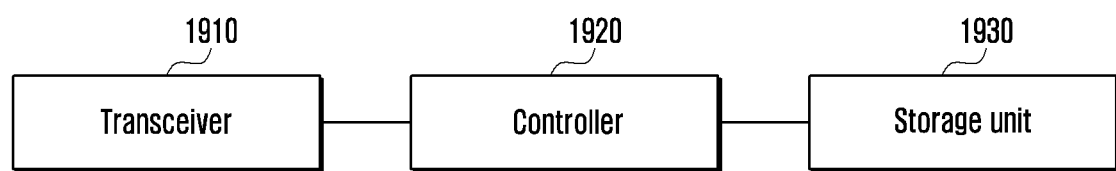
FIG. 19 is a diagram of a structure of the UE, according to an embodiment.

FIG. 19 is a diagram of a structure of the UE, according to an embodiment.

Referring to FIG. 19, the UE may include a transceiver 1910, a controller 1920, and a storage unit 1930. The controller is a physical element and may be defined as a circuit, an application-specific integrated circuit, or at least one processor.

The transceiver 1910 may transmit/receive a signal to/from another network entity. The transceiver 1910 may receive system information from the BS and receive a synchronization signal or a reference signal.

The controller 1920 may control the overall operation of the UE. The controller 1920 may control a signal flow between blocks to perform the operations/steps described above. The controller 1920 may control the operation in order to receive remaining system information (RMSI) in a multibeam-based system.

The storage unit 1930 may store at least one piece of information transmitted/received through the transceiver 1910 and information generated through the controller 1920. The storage unit 1930 may store scheduling information related to RMSI transmission, a physical downlink control channel (PDCCH) time axis location related to the RMSI, and period information of the RMSI.

Figure 20:
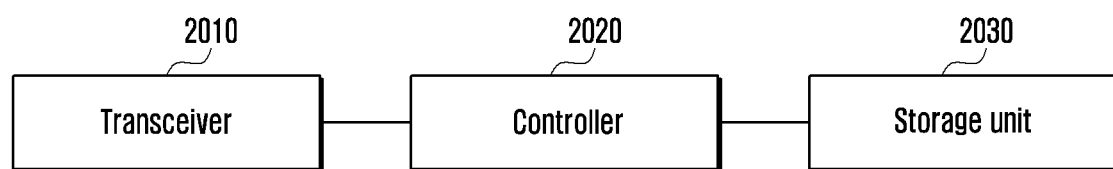
FIG. 20 is a diagram of a structure of the base station (BS), according to an embodiment.

FIG. 20 is a diagram of a structure of the BS, according to an embodiment.

Referring to FIG. 20, the BS may include a transceiver 2010, a controller 2020, and a storage unit 2030. The controller may be defined as a circuit, an application-specific integrated circuit, or at least one processor.

The transceiver 2010 may transmit/receive a signal to/from another network entity. The transceiver 2010 may transmit system information to the UE and transmit a synchronization signal or a reference signal.

The controller 2020 may control the overall operation of the BS. The controller 2020 may control a signal flow between blocks to perform the operations/steps described above. The controller 2020 may control the operation in order to transmit the RMSI in a multibeam-based system.

The storage unit 2030 may store at least one piece of information transmitted/received through the transceiver 2010 and information generated through the controller 2020. The storage unit 2030 may store scheduling information related to RMSI transmission, a PDCCH time axis location related to the RMSI, and period information of the RMSI.

Not only the UE and the BS but also each of the devices (e.g., the AMF, the SMF, or the UPF) included in the network system may include the transceiver, the controller, and the storage unit.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a session management function (SMF) entity in a wireless communication system, the method comprising:
    allocating a first protocol data unit (PDU) session anchor at a procedure for establishing a PDU session on a terminal;
    allocating a second PDU session anchor, the second PDU session anchor being associated with the PDU session, the first PDU session anchor being associated with a service and session continuity (SSC) mode of the PDU session, and the second PDU session anchor being independent of the SSC mode of the PDU session;
    identifying a mobility of the terminal;
    maintaining the first PDU session anchor regardless of the mobility of the terminal in case that the SSC mode of the PDU session is SSC mode 1; and
    releasing the second PDU session anchor based on the mobility of the terminal.

2. The method of claim 1, wherein the second PDU session anchor is used for selective traffic routing to a data network.

3. The method of claim 1, wherein maintaining the first PDU session anchor comprises:
    identifying whether the terminal is located out of a service coverage of the first PDU session anchor; and
    adding an intermediate user plane function (UPF) entity for data forwarding between the first PDU session anchor and the terminal.

4. The method of claim 1, wherein releasing the second PDU session anchor comprises:
    identifying whether the terminal is located out of a service coverage of the second PDU session anchor; and
    releasing the second PDU session anchor regardless of the SSC mode of the PDU session, in case that the terminal is located out of the service coverage of the second PDU session anchor.

5. The method of claim 1, further comprising:
    establishing an uplink classifier for the PDU session; and
    transmitting, to the uplink classifier, uplink data for routing an uplink packet to the first PDU session anchor or the second PDU session anchor.

6. The method of claim 5, wherein establishing the uplink classifier comprises providing, to the uplink classifier, traffic filters indicating what traffic is forwarded towards the first PDU session anchor and the second PDU session anchor respectively.

7. A session management function (SMF) entity in a wireless communication system, the SMF entity comprising:
    a transceiver; and
    a controller configured to:
        allocate a first protocol data unit (PDU) session anchor at a procedure for establishing a PDU session on a terminal,
        allocate a second PDU session anchor, the second PDU session anchor being associated with the PDU session, the first PDU session anchor being associated with a service and session continuity (SSC) mode of the PDU session, and the second PDU session anchor being independent of the SSC mode of the PDU session,
        identify a mobility of the terminal,
        maintain the first PDU session anchor regardless of the mobility of the terminal in case that the SSC mode of the PDU session is SSC mode 1, and
        release the second PDU session anchor based on the mobility of the terminal.

8. The SMF entity of claim 7, wherein the second PDU session anchor is used for selective traffic routing to a data network.

9. The SMF entity of claim 7, wherein the controller is further configured to:
    identify whether the terminal is located out of a service coverage of the first PDU session anchor, and
    add an intermediate user plane function (UPF) entity for data forwarding between the first PDU session anchor and the terminal.

10. The SMF entity of claim 7, wherein the controller is further configured to:
    identify whether the terminal is located out of a service coverage of the second PDU session anchor, and
    release the second PDU session anchor regardless of the SSC mode of the PDU session, in case that the terminal is located out of the service coverage of the second PDU session anchor.

11. The SMF entity of claim 7, wherein the controller is further configured to:
    establish an uplink classifier for the PDU session, and
    transmit, to the uplink classifier, via the transceiver, uplink data for routing an uplink packet to the first PDU session anchor or the second PDU session anchor.

12. The SMF entity of claim 11, wherein the controller is further configured to provide, to the uplink classifier, via the transceiver, traffic filters indicating what traffic is forwarded towards the first PDU session anchor and the second PDU session anchor respectively.

* * * * *